Nov. 20, 1962  K. G. SEARS ETAL  3,065,414
AUTOMATIC TESTING APPARATUS
Filed July 1, 1957  15 Sheets—Sheet 3

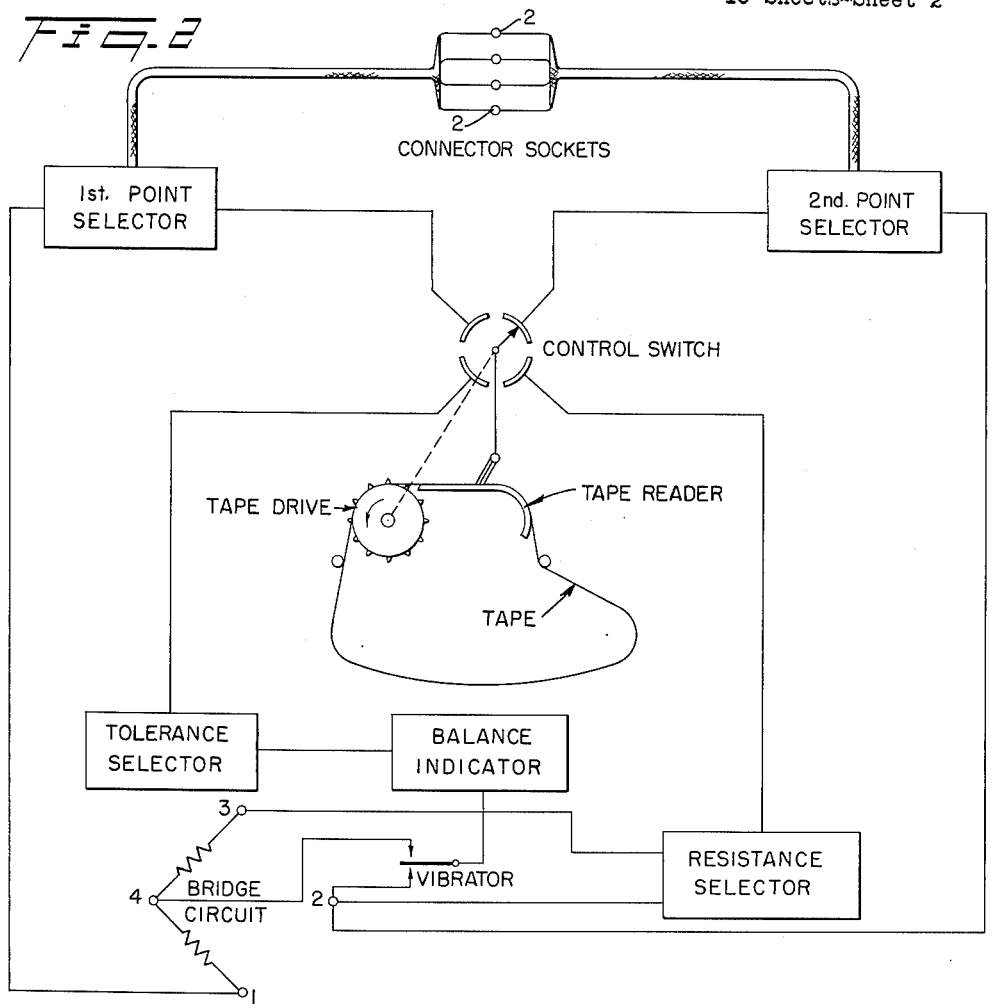
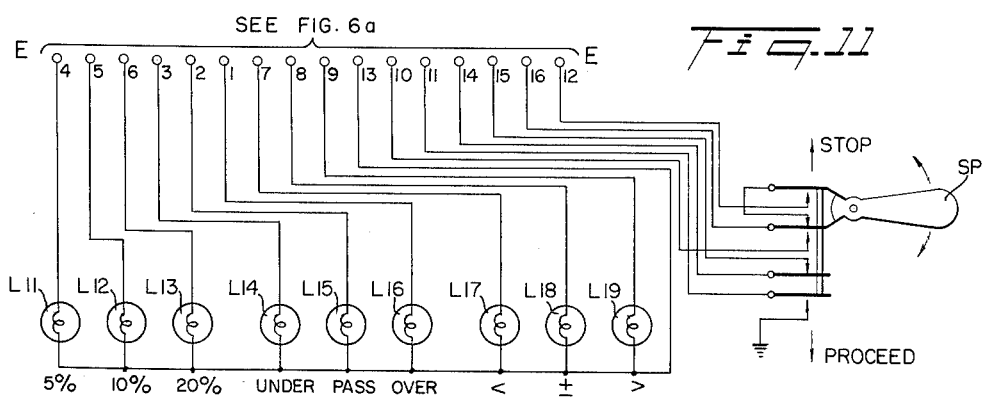

| SIGNIFICANCE OF BLOCKS | | | | TAPE BEFORE PUNCHING | | | | EXAMPLES AFTER PUNCHING EX. NO. 1 | | | | EX. NO. 2 | | | |
|---|---|---|---|---|---|---|---|---|---|---|---|---|---|---|---|
| PIN NO. | PIN NO. | 1st DIGIT | NO. OF ZERO'S | 1 | 1 | 1 | 1 | ☐ | 1 | 1 | 1 | 1 | ☐ | ☐ | ☐ |
| | | | | 2 | 2 | 2 | 2 | 2 | ☐ | ☐ | 2 | ☐ | 2 | ☐ | ☐ |
| | | | | 4 | 4 | 4 | 4 | 4 | 4 | ☐ | ☐ | 4 | 4 | ☐ | ☐ |
| | | | | 8 | 8 | 8 | 5 | ☐ | ☐ | ☐ | ☐ | ☐ | ☐ | ☐ | ☐ |
| SOCKET NO. | SOCKET NO. | 2nd DIGIT | TOL. VALUES | 1 | 1 | 1 | 10 | 1 | ☐ | 1 | 10 | ☐ | 1 | ☐ | 10 |
| | | | | 2 | 2 | 2 | 20 | 1 | 2 | ☐ | ☐ | 2 | ☐ | 2 | ☐ |
| | | | | ○ | ○ | ○ | ○ | ○ | ○ | ○ | ○ | ○ | ○ | ○ | ○ |
| | | | TOL. LIMIT | 4 | 4 | 4 | ±  | ☐ | 4 | ☐ | ☐ | ☐ | ☐ | ☐ | ± |
| | | | | 8 | 8 | 8 | | 8 | 8 | ☐ | ☐ | 8 | 8 | ☐ | ☐ |
| | | 3rd DIGIT | | 12 | 12 | 12 | > | 12 | 12 | ☐ | > | 12 | 12 | 1 | ☐ |
| | | | | | | | 2 | | | ☐ | | | | ☐ | ☐ |
| | | | | | | | 4 | | | ☐ | | | | 4 | ☐ |
| | | | STOP | | | | 8 | | | ☐ | | | | ☐ | ☐ |
| | | | | | | | S | | | | | | | | |

POINT NO. 1 | POINT NO. 2 | RESISTANCE | DEC. MULT. & TOL. LIM.

Fig. 3

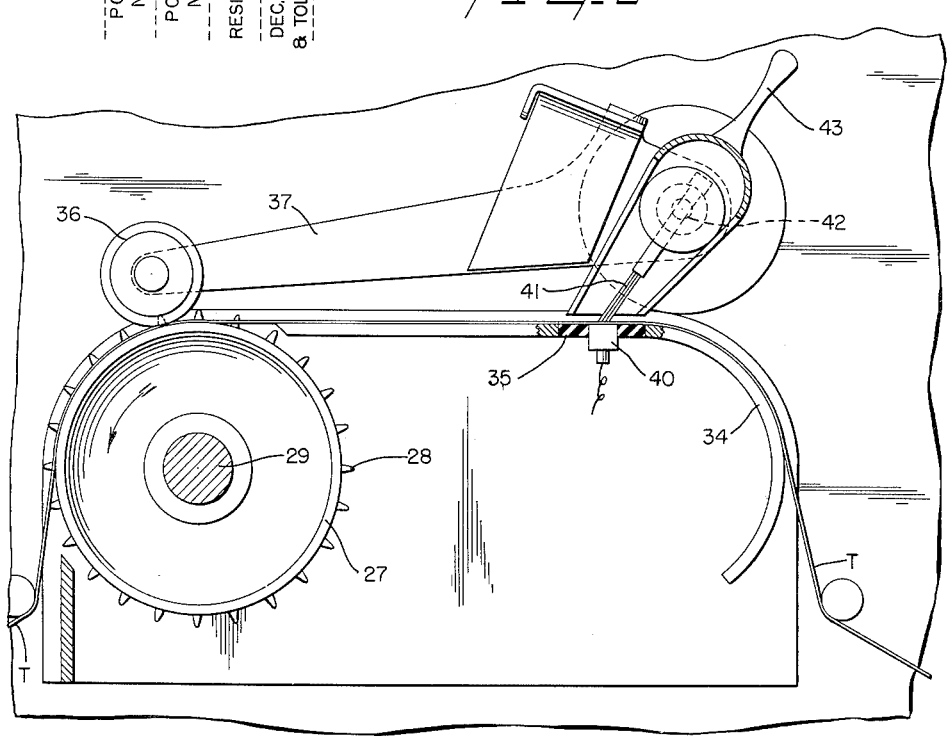

Fig. 4

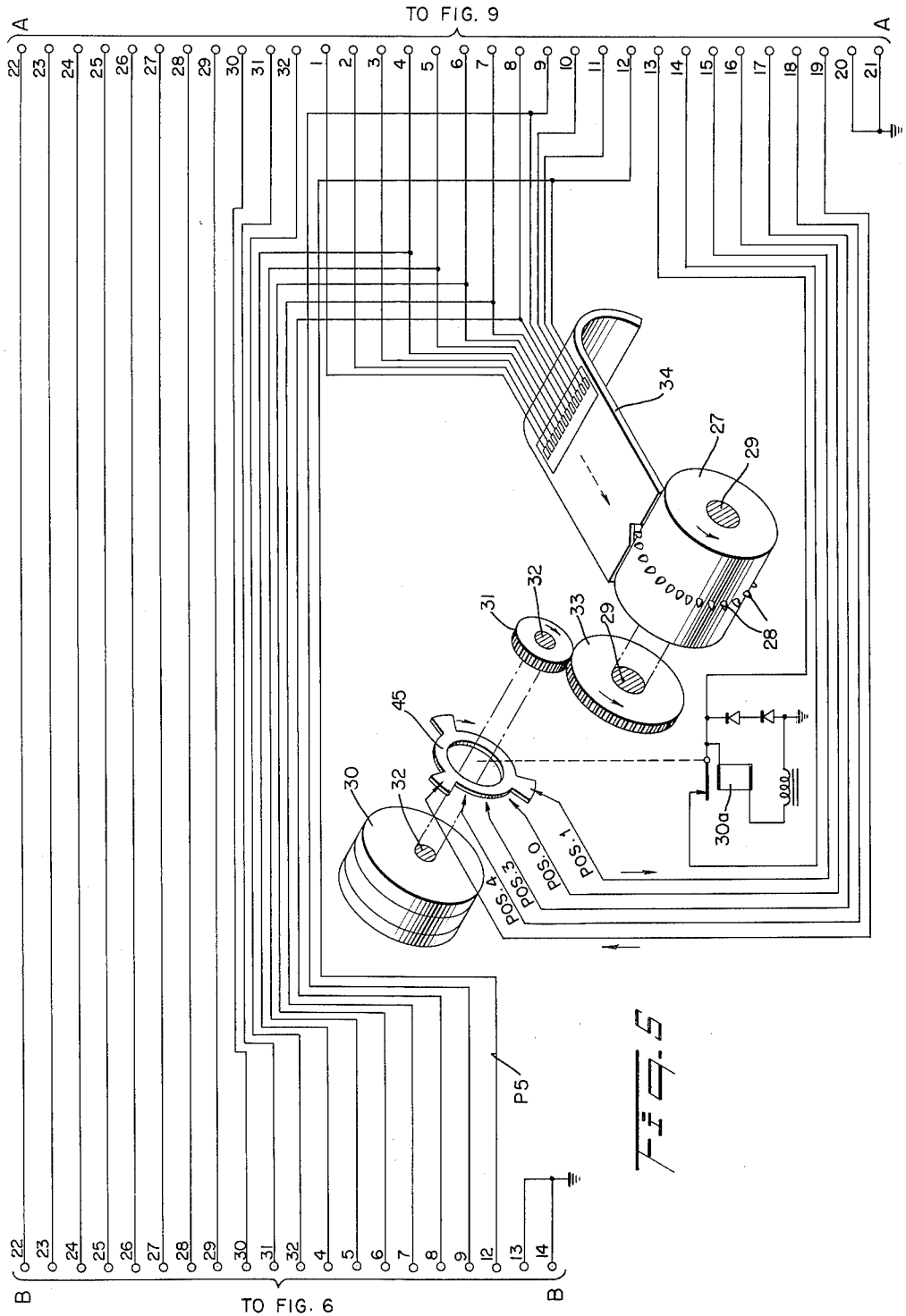

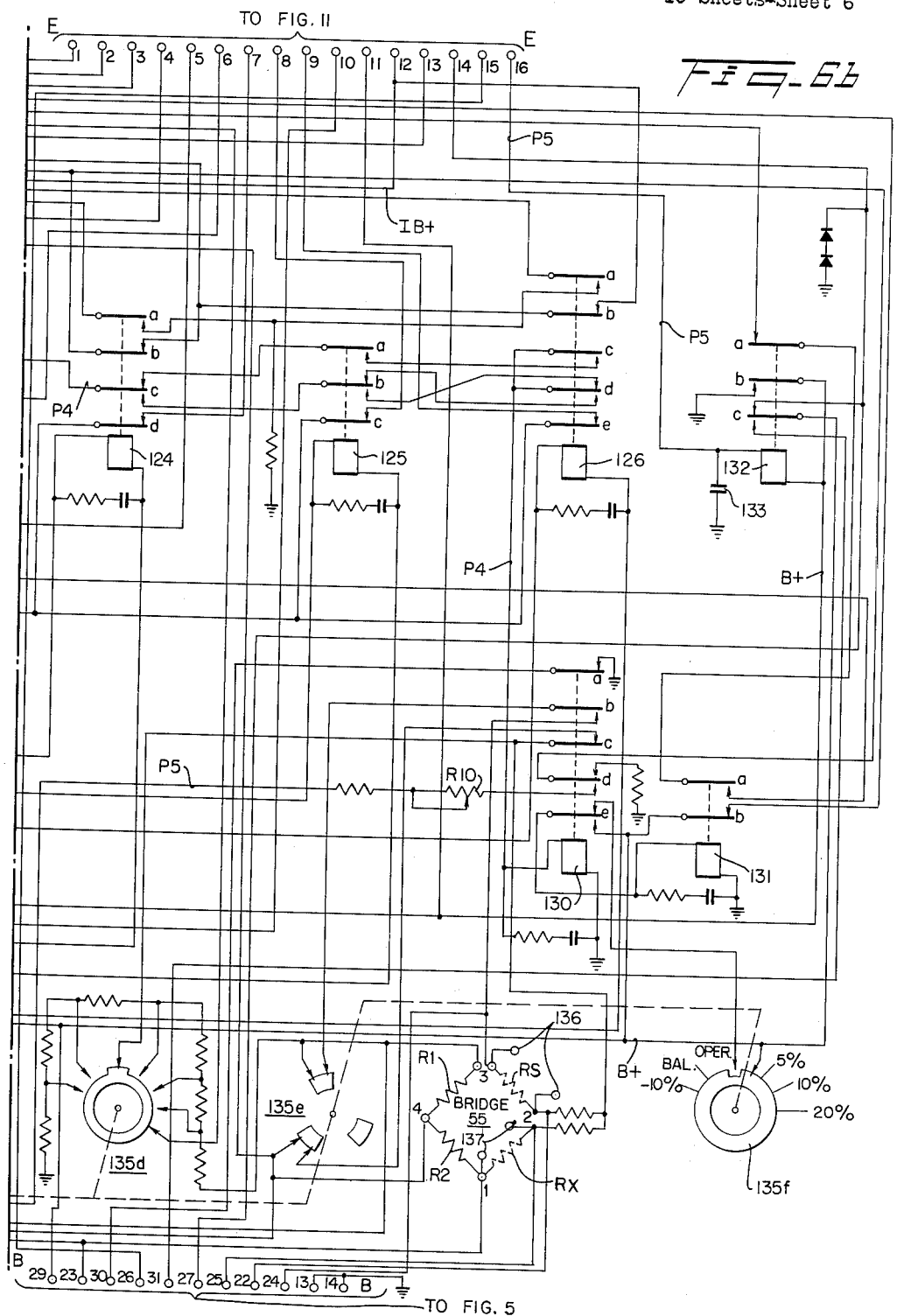

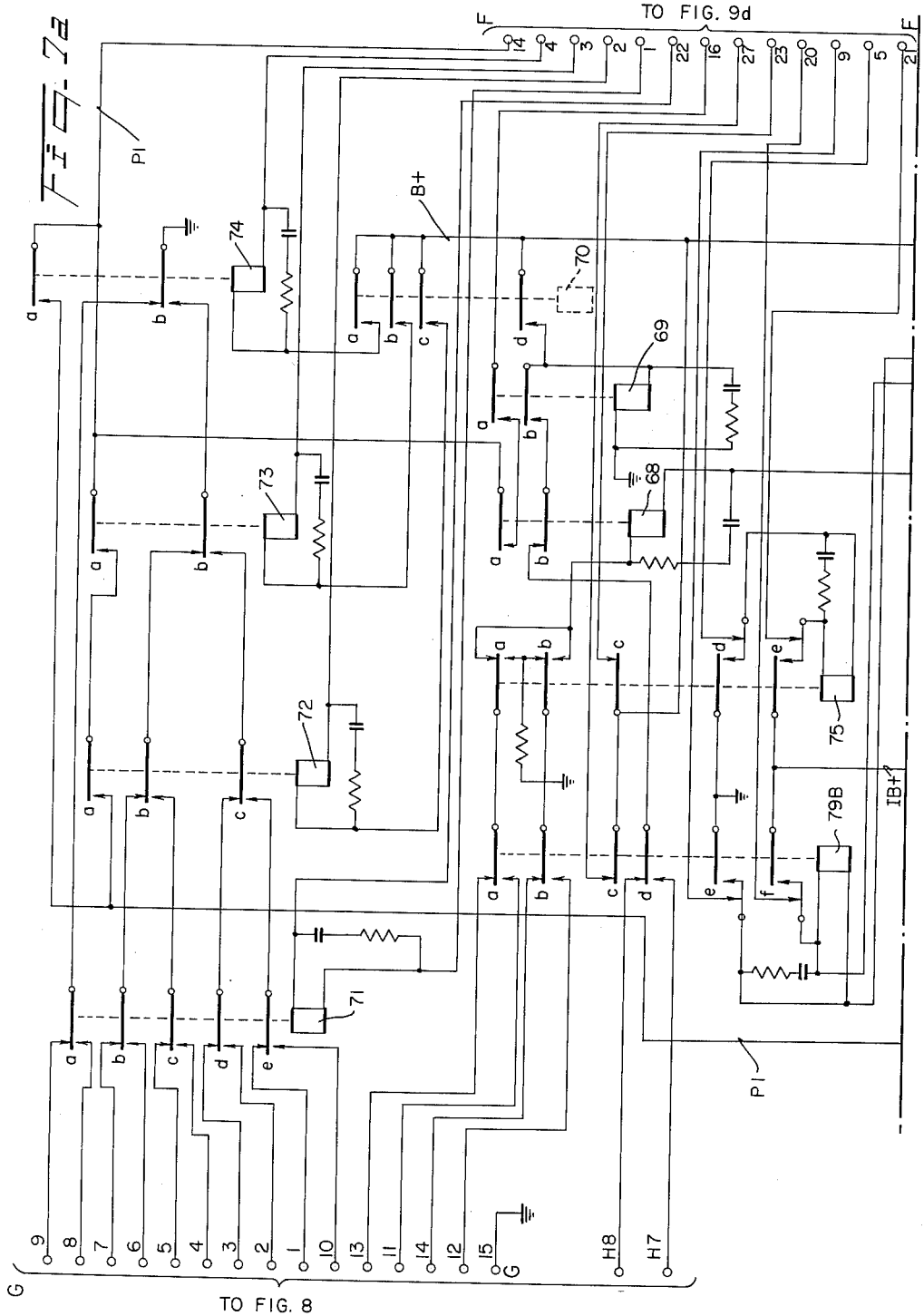

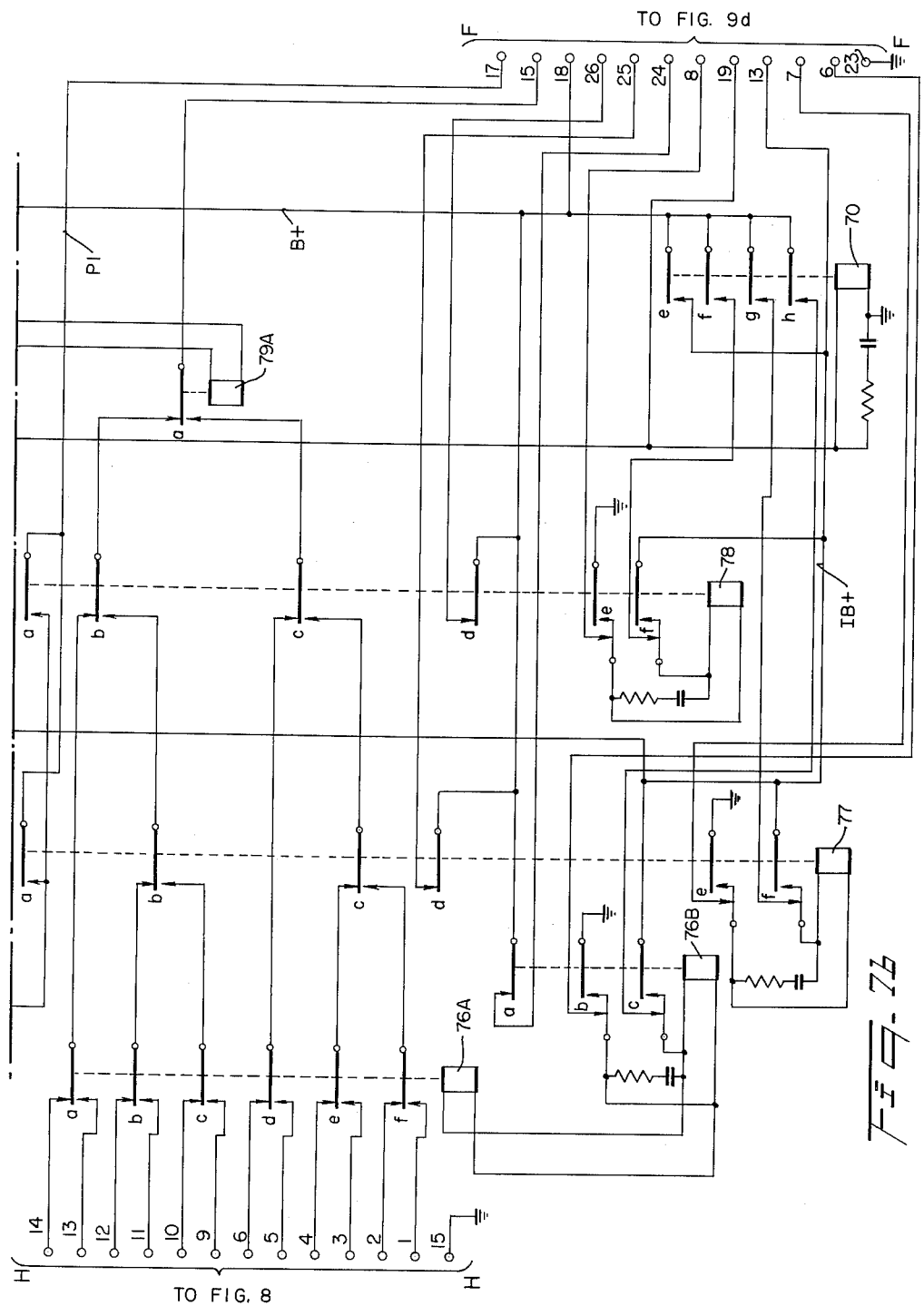

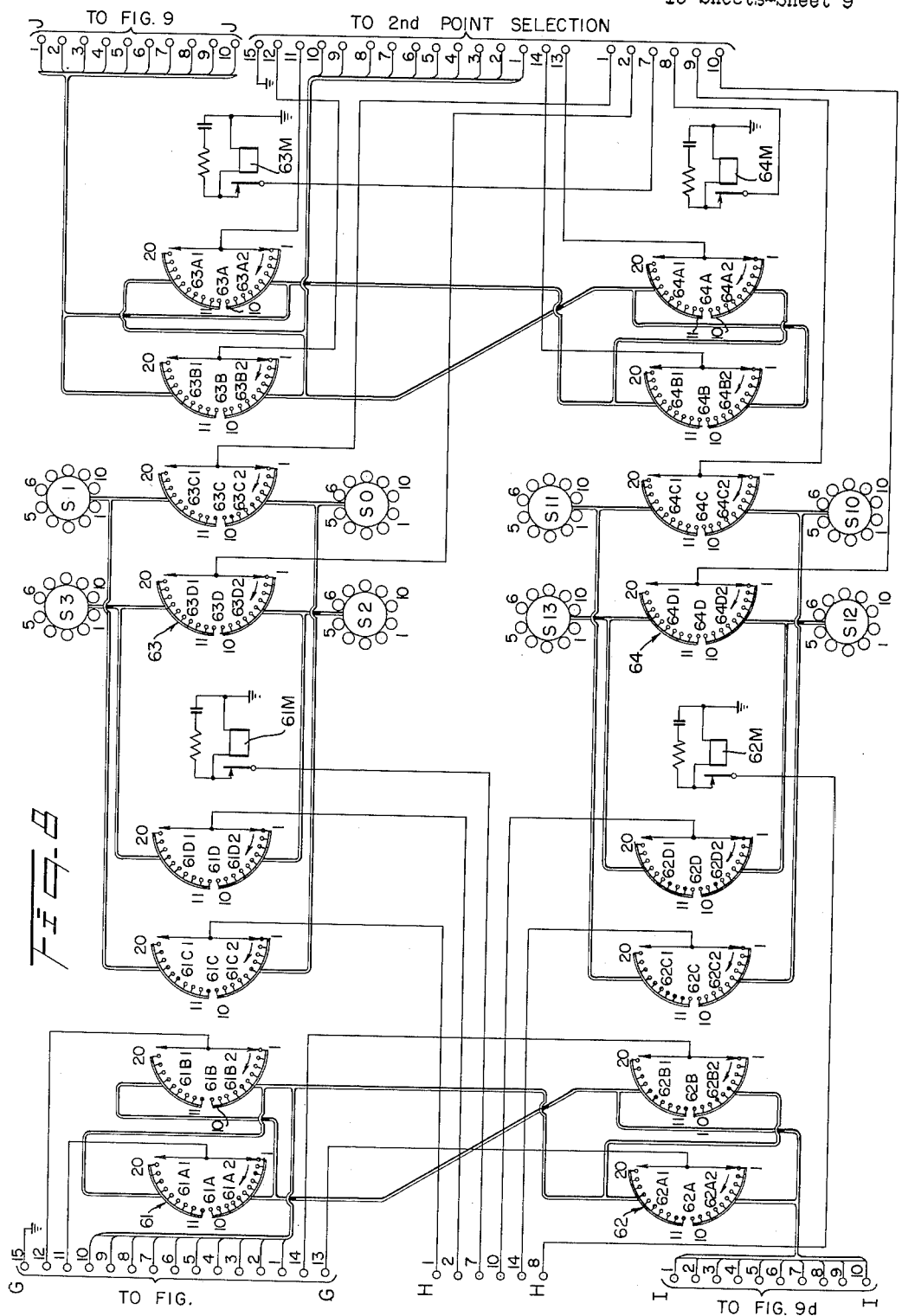

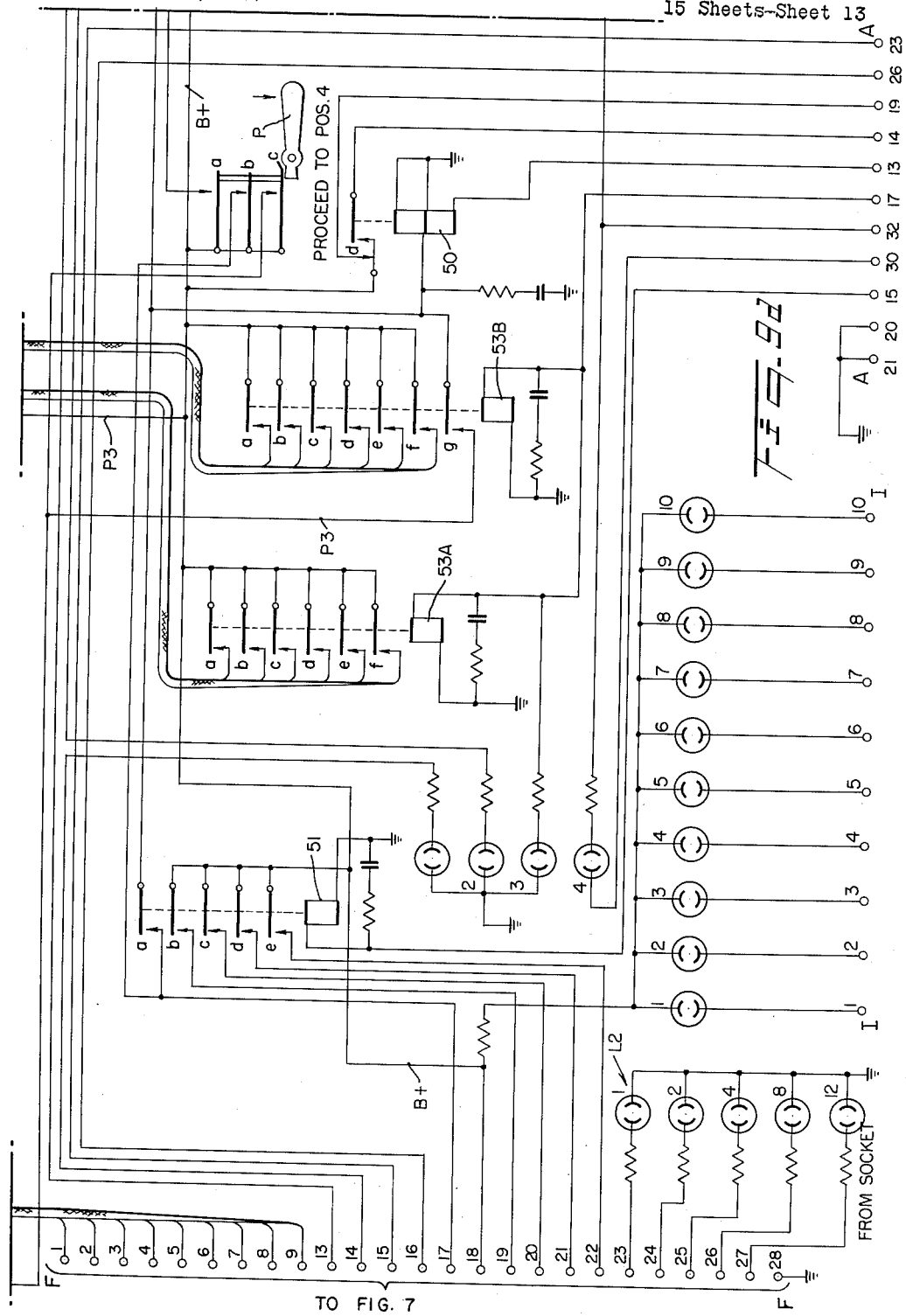

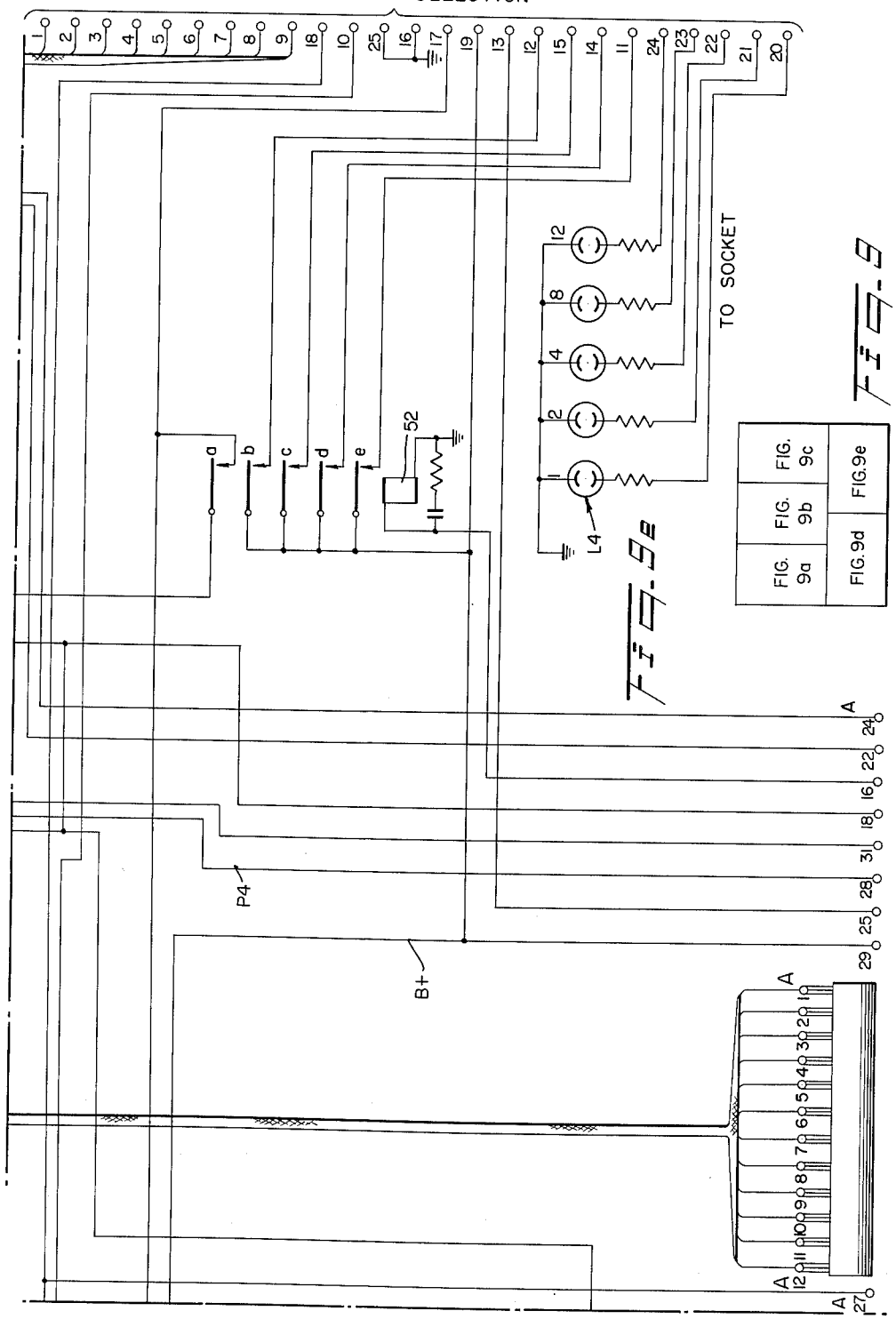

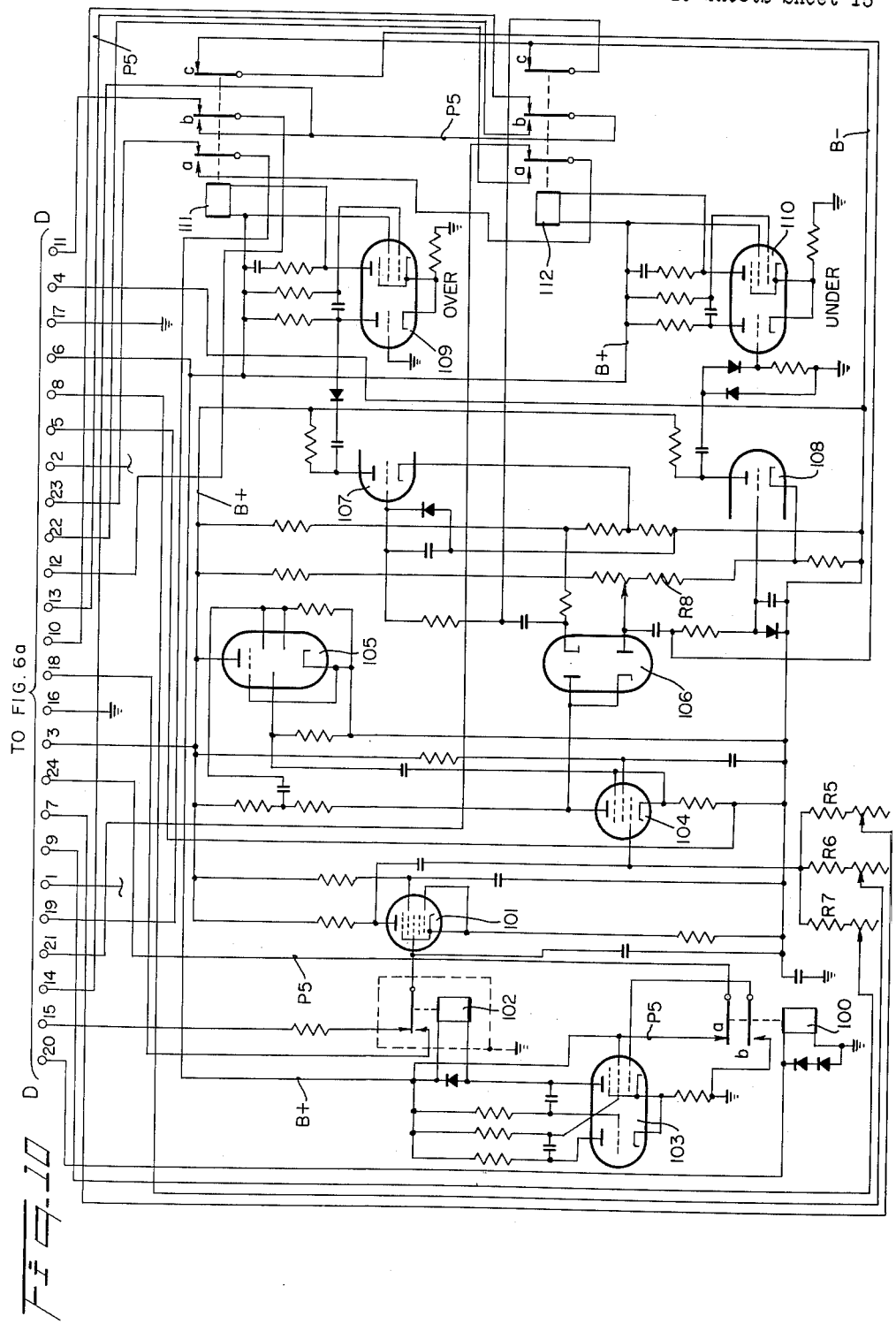

United States Patent Office 3,065,414
Patented Nov. 20, 1962

3,065,414
AUTOMATIC TESTING APPARATUS
Kay G. Sears and Richard M. Logue, Keyport, N.J., and Nikita Koulomzin, South Nyack, N.Y., assignors to Lavoie Laboratories, Inc., Morganville, N.J., a corporation of New Jersey
Filed July 1, 1957, Ser. No. 669,085
10 Claims. (Cl. 324—57)

The present invention relates to apparatus for automatically testing the circuits of electrical and electronic equipment.

Radios, television receivers, and other electronic equipment have intricate circuitry requiring many electrical elements and many connections. In order for the equipment to function satisfactorily, each element and each connection has to be correct. The checking of such equipment on completion of manufacture is a tedious and time-consuming operation adding materially to the cost of production. Moreover, manual testing involves human error. If a tester fails to make a required check or makes it improperly, defects in a piece of equipment may escape detection. A similar problem arises in subsequently servicing the equipment when extensive tests may be required to detect and locate actual or incipient defects in the equipment.

Apparatus has heretofore been proposed to check electronic equipment automatically or semi-automatically. However, such apparatus has been too complicated and expensive, too difficult to operate properly and not sufficiently reliable to be satisfactory for widespread use.

It is an object of the present invention to provide automatic circuit testing apparatus that is relatively inexpensive and yet extremely reliable. Moreover, the apparatus in accordance with the invention is highly versatile and can be changed over quickly to test different circuits. It is capable of making a large number of tests automatically one after another in a short period of time.

In checking the circuitry of a piece of electrical equipment, the apparatus in accordance with the invention checks the impedance between selected pairs of points of the circuit to determine whether the value of the impedance is correct within prescribed limits. For simplicity of operation it has been found desirable in most instances to measure direct current resistance. In programing the tests, the correct resistance between the selected points of the circuit can be readily determined from the circuit diagram. Deviataion from these values beyond permissible tolerances indicates incorrect connection or malfunctioning of the circuit. For example a high resistance between two points that are supposed to be connected indicates a poor connection or an open circuit. Conversely low resistance between points that are supposed to be insulated from one another indicates a short circuit or other incorrect connection. Likewise, if the resistance between two points is supposed to be a predetermined value for example 100 ohms, the apparatus determines whether the value is correct within selected limits of tolerance or is too low or too high.

In order to check the resistance between a large number of pairs of points one after another, the testing apparatus is connected in advance to numerous points of the equipment to be tested. As electronic equipment ordinarily has a number of multiple pin sockets to receive tubes and other plug-in units, the connections are conveniently made by means of multiple conductor cables from the testing apparatus, each cable having a plug fitting into one of the sockets of the equipment to be tested. The connections between the equipment and the testing apparatus are thus quickly made and subsequently disconnected so that successive pieces of equipment can be rapidly tested one after another.

The programing of the tests is controlled by a record which is preferably in the form of a strip or tape prepared in advance for the testing of each type or model of equipment. The instructions on the tape may be recorded in various ways for example by selectively magnetizing a magnetic tape, providing strips or spots of different electrical conductivity or providing an optical pattern to be read by photosensitive elements. However, it is presently preferred to use a punched tape as it is easily prepared, can be visually inspected and is easily read by means of simple electric fingers or brushes. The tape controls the selection of points between which resistance is to be measured, the selection of the resistance values that are to be found, and the tolerances permissible for each reading. If the resistance between the first selected pair of points of the circuit meets the test, the apparatus indicates this fact and proceeds automatically to the next test. Successive tests are thus performed in rapid sequence. If a defect is found, the apparatus indicates the location and nature of the defect so that it can be corrected.

A feature of the apparatus in accordance with the invention is that the steps of selecting the first point of the circuit to be tested, selecting the second point, selecting the correct resistance value and setting the permissible tolerance are performed sequentially. Thus for example when using a punched tape, selected holes in one transverse row control selection of the first point, the second row controls selection of the second point and the third and fourth rows control the resistance value and tolerances. This sequential operation permits the use of a relatively narrow standard tape while still providing apparatus having the capacity to handle a large number of point selections and a wide range of resistance values.

The objects and advantages of the invention will be more fully understood from the following description and claims in conjunction with the accompanying drawings which illustrate by way of example a preferred embodiment of the invention and in which:

FIG. 2 is a simplified block diagram of the apparatus.

FIG. 3 is an enlarged schematic view of a section of tape for controlling the apparatus.

FIG. 4 is a front elevation of the central control unit which controls the programing of the tests in accordance with the record on the tape.

FIG. 5 is an exploded perspective view showing schematically the principal parts of the central control unit and also showing associated circuit connections.

Figure 6A:
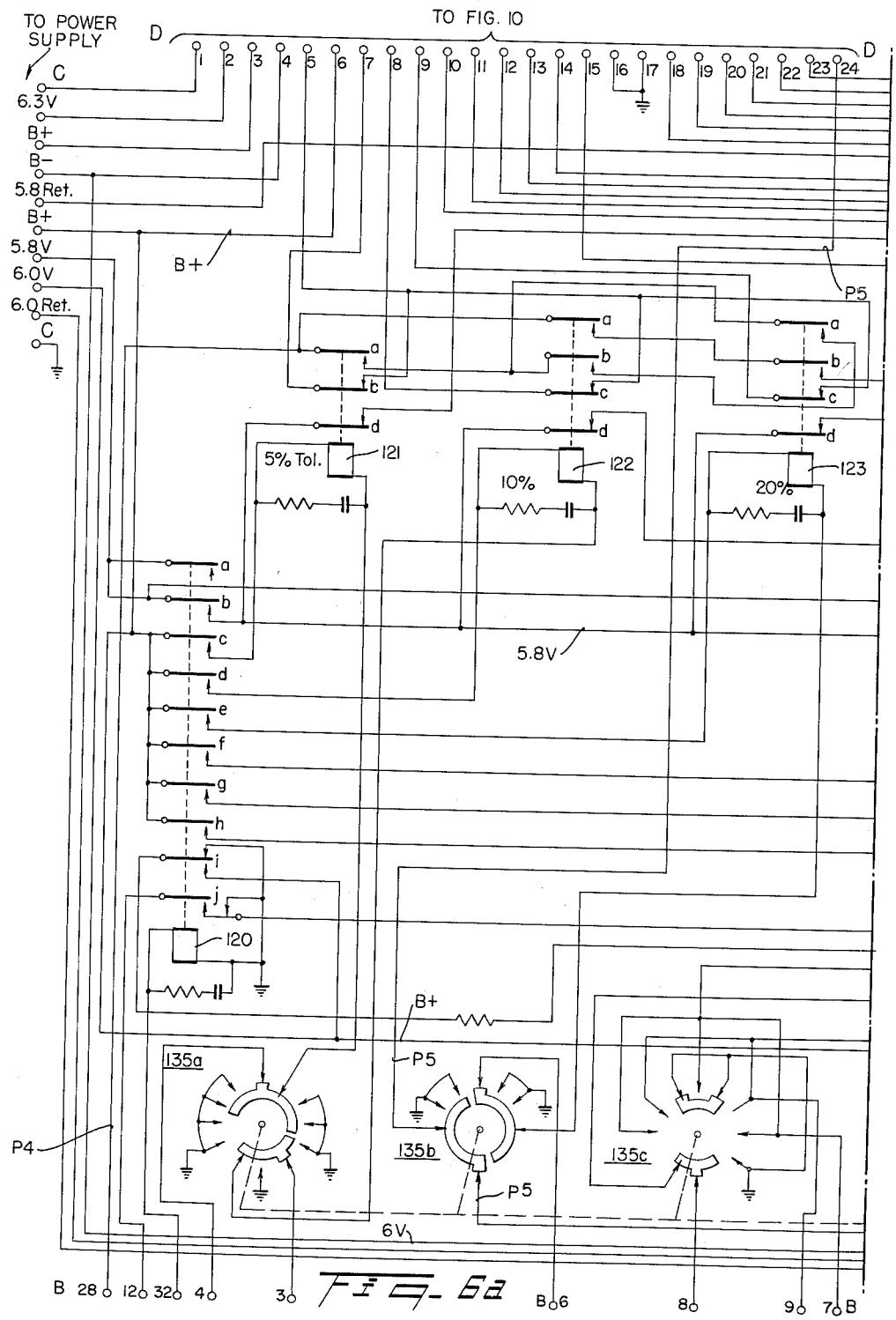

FIG. 6 comprising portions 6a and 6b is a circuit diagram of the main chassis relay assembly and bridge circuit.

FIG. 7 comprising portions 7a and 7b is a circuit diagram of a selecting switch assembly for selecting one of the points of the circuit to be tested, there being a similar circuit for selecting the other points.

FIG. 8 is a simplified circuit diagram of rotary selecting switches cooperating with the selecting switch assembly of FIGS. 7a and 7b to select the points of connection of the circuit being tested.

Figure 9A:
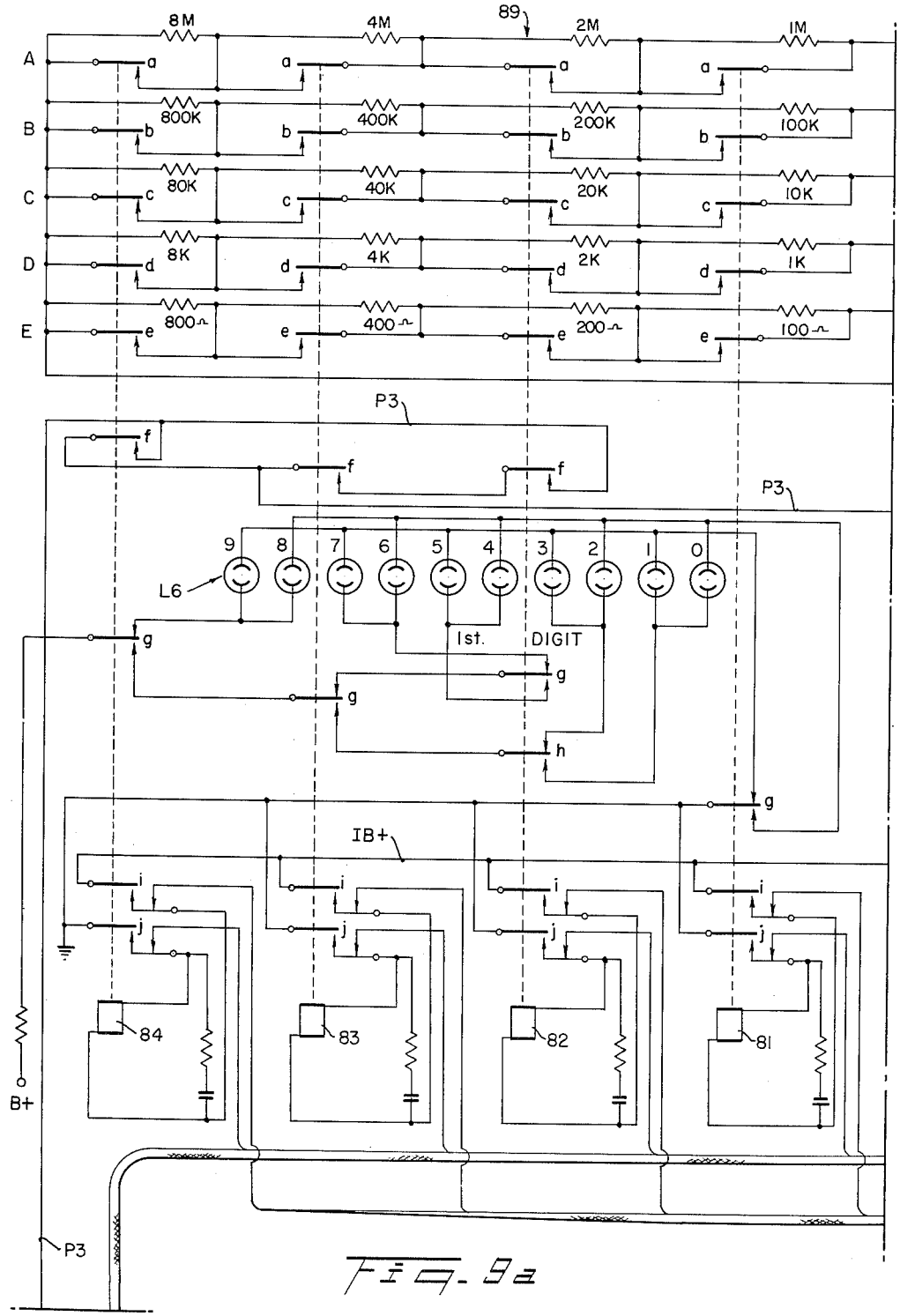
Figure 9B:
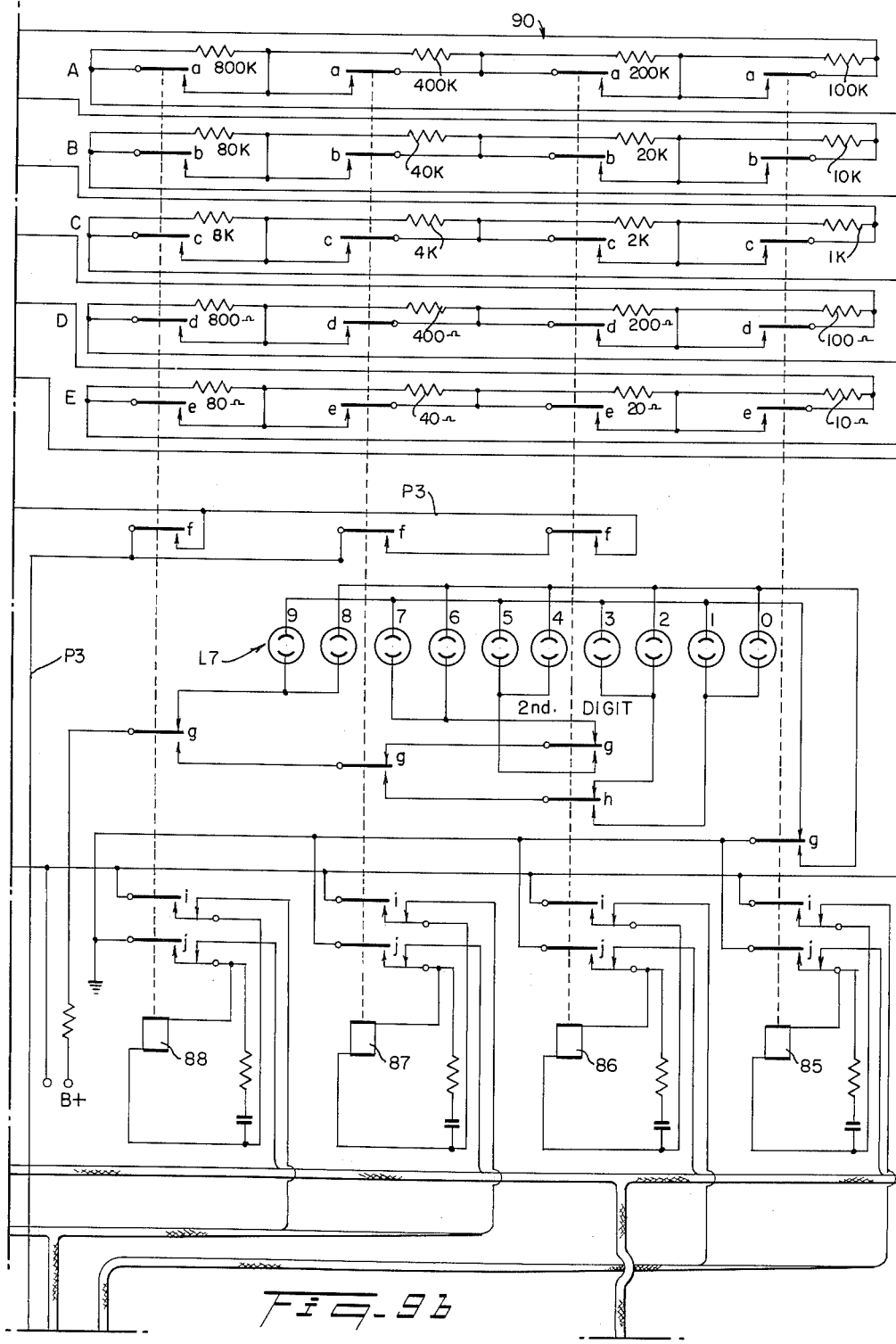
Figure 9C:
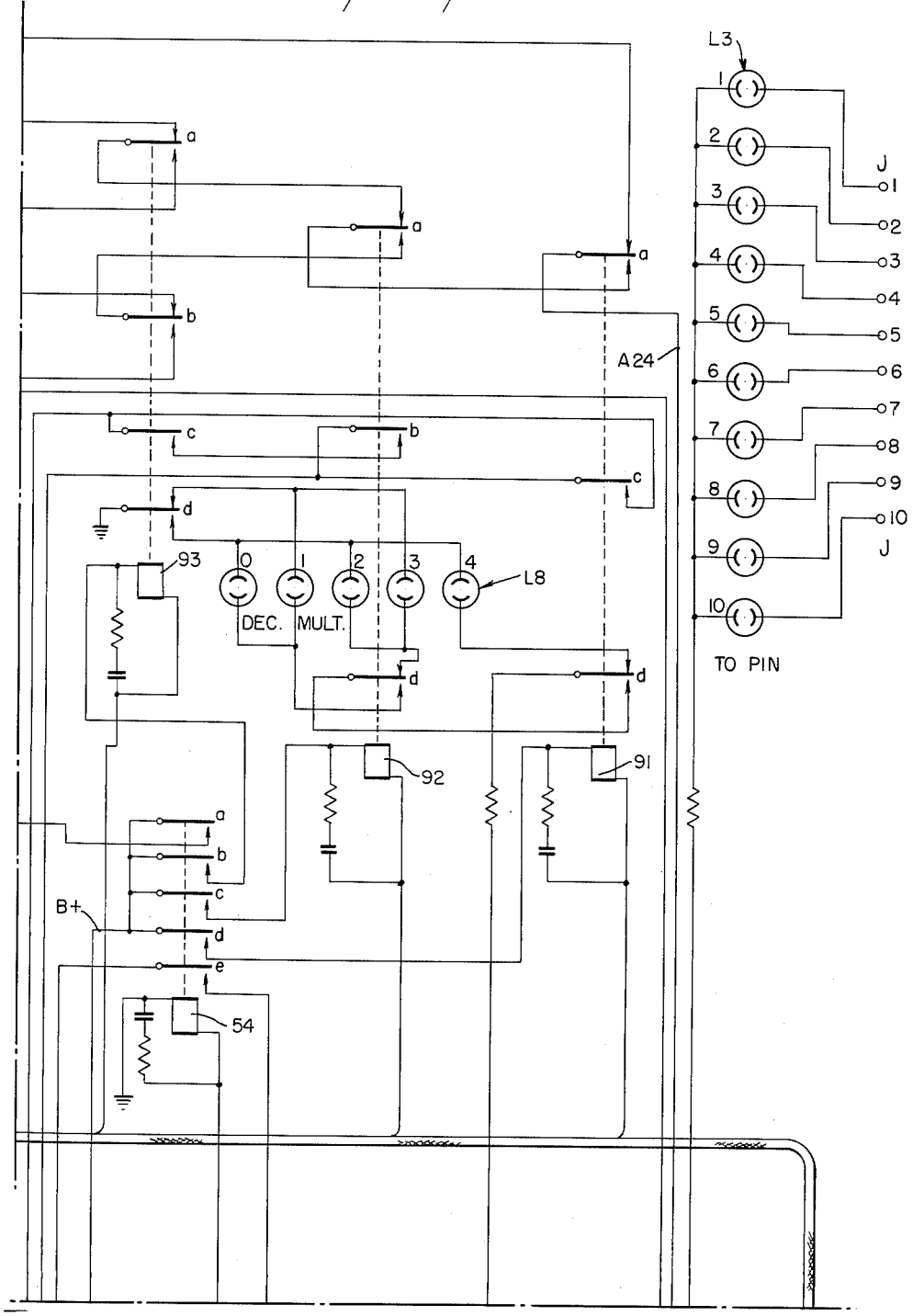

FIG. 9 comprising portions 9a through 9e is a circuit diagram of the circuits for selecting a resistance in accordance with the record on the tape, the relation of FIGS. 9a through 9e being indicated in the block diagram of FIG. 9.

FIG. 10 is a circuit diagram of a bridge amplifier ana tolerance selection circuit.

FIG. 11 is a circuit diagram of the front panel of the apparatus including indicator lights and a manual "stop" and "proceed" control.

Figure 1:
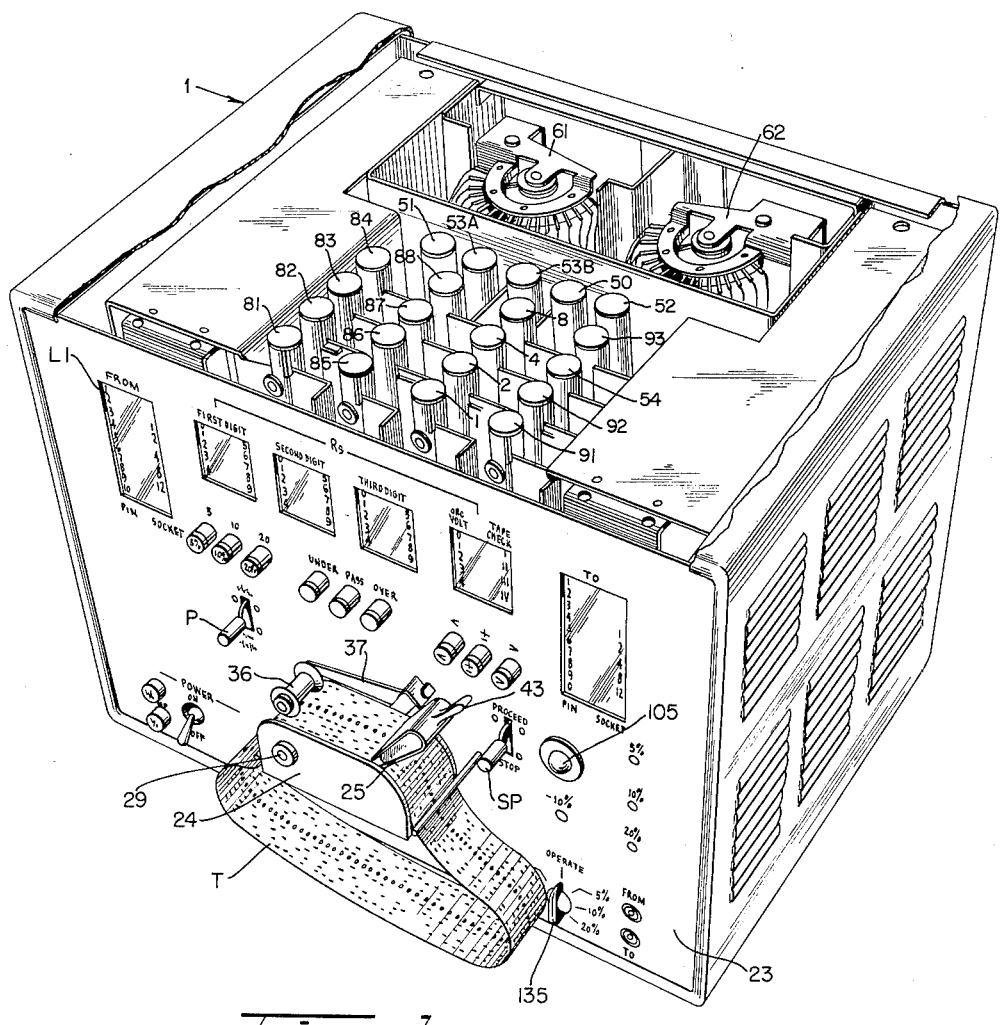
FIG. 1 is a front perspective view of apparatus in accordance with the invention with a portion of the cover removed.

The embodiment of the invention shown by way of example in the drawings is an automatic tester in the form of a single compact unit contained in a housing or cabinet 21, a portion of which is broken away in FIG. 1 to show the interior. In the back of the cabinet 21, there are provided a plurality of sockets 22 of which four are shown schematically in FIG. 2, it being understood that in the actual apparatus there are preferably more, for example twenty four. As electronic circuits customarily have sockets for tubes and other removable elements, the apparatus is conveniently connected to the circuit to be tested by a plurality of multiple conductor cables (not shown), each having a multiple pin plug at one end fitting into one of the sockets 22 and a multiple pin plug at the other end adapted to fit into a tube socket or other socket of the circuit to be tested. Thus for example if a circuit has sixteen 10-pin sockets there will be provided 160 points of connection between the testing apparatus and the circuit to be tested. The points of connection to the circuit are conveniently designated by the number of the socket and the pins of each socket. Moreover, it will be understood that the multiple conductor cables may be provided at one end with an adaptor or fixture (not shown) for testing printed circuits, in place of the multiple pin plug fit into the tube, socket or other socket of the circuit to be tested. The points of connection to the circuit are provided by the adapter and are conveniently designated in the manner disclosed above.

The cabinet 21 has a front panel 23 which accommodates a plurality of indicators and controls of the apparatus. The feeding mechanism 24 and reading mechanism 25 for a tape T is also mounted on the front face of the panel 23 in convenient position for inserting and removing a tape and for visually inspecting a tape while it is being used. Testing instructions can be recorded on the tape in any desired manner for example magnetically or photographically. However, the use of a punched tape is at present preferred since it can be easily prepared and can be examined visually to determine whether it has been properly punched and also to determine the selections and values that are scheduled for each particular test.

The tape T is punched to program the operations required for the tests that are to be performed on the circuit. For example in checking the resistance from one point in the circuit to another, the operations are as follows:

(1) Selecting and making contact to one of the points of the circuit.

(2) Selecting and making contact to the second point.

(3) Selecting and making contact to standard resistance elements to provide a resistance value equal to the resistance that should be found between the selected points if the circuit is correct.

(4) Setting up permissible tolerance of deviation from the selected resistance value.

(5) Comparing the resistance between the selected points of the circuit with the selected correct resistance value and determining whether they are equal within the permitted tolerance limits.

(6) Indicating whether the resistance between the selected circuit points is too low or too high in the event it is outside the selected limits.

(7) Passing automatically to the next test if the results of the test performed are satisfactory.

If it were attempted to set up all of the information required for an individual test in a single transverse row of holes in a punched tape, the tape would be so wide that it would be difficult to handle and "read." To avoid this objection, the information for an individual test is set up in a plurality of successive transverse rows. As illustrated by the example shown in the enlarged view of FIG. 3, four transverse rows of holes are used for each individual test. This permits a wide range of selection even though there are only twelve hole spaces or blocks in each transverse row.

In FIG. 3 labels are applied to the first section of tape to indicate the significance of the blocks. The second section shows the tape before punching while the next two sections show examples after punching. It will be seen that the first row of blocks controls the selection of the first point in the circuit which may be designated point number 1. The point is designated by pin and socket numbers, the first four blocks in the row designating the pin number and the next five blocks the socket number, using a binary system. The second row of blocks controls the selection of the second point of the circuit in like manner. The blocks of the third row control the first, second and third digits of the selected resistance value, likewise using a binary system. The first three blocks of the fourth row control the number of zeros following the digits of selected resistance value and thus complete the resistance selection. The next three blocks of the fourth row control the selection of tolerance values, the values given by way of example being five, ten and twenty percent. The following three blocks in the fourth row control the tolerance limits to designate whether the resistance may be less than, plus or minus or greater than the selected value. The last block in the fourth row controls whether or not the apparatus passes automatically to the next test. Preferably the unselected blocks are punched out leaving the selected blocks. This facilitates reading the tape visually.

In example number 1 shown in FIG. 3, the first selected point is pin number 6 of socket number 21. The second point is pin 5 of socket 22. The digits of the resistance set up in the third row are 150. Three zeros are set up in the fourth row so that the total resistance value is 150,000 ohms. The permissible tolerance is −10%. The "stop" block is punched out so that the apparatus will proceed automatically to the next test.

The tape feeding mechanism as illustrated in FIG. 4 and schematically in FIGS. 2 and 5 comprises a rotatable drum 27 having on its periphery a circular series of spaced points or teeth 28 adapted to mesh with a central row of driving holes provided in the tape. The drum 27 is mounted on a shaft 29 and is driven by a stepping rotary electric motor 30 having an operating coil 30a. A pinion 31 on the motor shaft 32 meshes with a larger gear 33 on the drum shaft 29. Each time the motor 30 is energized, it steps forward a predetermined amount so as to advance the drum 27 a distance equal to one row of blocks on the tape. The drum 27 turns in a counter-clockwise direction as viewed in FIG. 4 and draws the tape T over a guide plate 34 having an insulating section 35. The tape is held firmly in contact with the drum 27 by a pressure roller 36 carried on a pivoted arm 37 which is biased to press the roller 36 toward the drum.

The tape reading means comprises a plurality of individual contacts 40 set flush in the insulating section 35 of the guide plate 34 and a plurality of brushes 41 which are swingably mounted on a shaft 42 and are biased so as to swing into contact with the contacts 40. A handle 43 is provided for manually raising the brushes, as for example when inserting or removing a tape. The brushes 41 are all grounded. The contacts 40 are insulated from one another and are located in positions corresponding to the individual blocks of the tape so that when a block is punched out, a brush will make contact with the corresponding contact 40. The tape feeding mechanism is adjusted so that each time the drum 27 stops, a row of blocks is presented in alignment with the contacts.

A rotary control switch 45 is actuated in synchronism with the tape drive and is operative to make connections so that the tape reading means successively controls means for selecting a first point of the circuit to be tested, means for selecting a second point, means for setting up a predetermined resistance value and means for determining the permissible tolerance. Thus the same tape reading means successively controls different functions of the machine. As illustrated in FIG. 5 the rotary switch 45 is mounted on the shaft 32 of the stepping motor 30 and the ratio of gears 31 and 33 is such that the shaft 32 makes one third of a revolution to advance the tape four rows of blocks. As illustrated in the drawings, the stepping motor 30 is controlled by a relay 50 and the rotary switch 45 controls a plurality of relays 51, 52, 53A, 53B and 54 (FIG. 9) which in turn control the sequential functioning of the apparatus as will be apparent from the circuit diagrams and the following description.

The circuit of the apparatus shown in the drawings comprises a tape drive unit (FIG. 5), a main chassis and bridge circuit (FIGS. 6a and 6b), a first point selector (FIGS. 7a and 7b), a second point selector which is substantially identical and is hence not shown, a stepping switch assembly (FIGS. 8a and 8b), a resistance selector (FIGS. 9 to 9e), a bridge amplifier circuit (FIG. 10) and front panel circuits (FIG. 11). In order to indicate the connections between the respective assemblies or units, the connecting leads or terminals are identified by the same reference characters. Thus for example the lead A1 of FIG. 5 connects to the lead A1 of FIG. 9. In order to simplify the wiring diagram, the leads are in some instances shown in different numerical order in one figure than in another.

The unknown resistance between the two selected points of a circuit to be tested is compared with a selected known resistance by means of a bridge circuit 55 (FIGS. 2 and 6b) having four terminals numbered 1 to 4, respectively. Terminal number 1 of the bridge is connected to a first selected point of a circuit to be tested and terminal number 2 is connected to a second selected point so that the resistance the selected direction between the two selected points constitutes an unknown resistance connected between terminals 1 and 2 of the bridge as indicated schematically in dotted lines in FIG. 6b. This unknown resistance is designated $Rx$. A selected standard resistance is connected between terminals 2 and 3 of the bridge as indicated schematically in dotted lines in FIG. 6b and is designated $Rs$. Two equal resistances R1 and R2 are connected respectively between terminals 3 and 4 and between terminals 4 and 1 of the bridge circuit. The resistances R1, R2, $Rx$ and $Rs$ thus constitute the four sides of the bridge circuit 55.

Selector switch means for connecting terminals 1 and 2 of the bridge circuit 55 respectively to selected points of the circuit to be tested are shown in FIGS. 7 and 8 as comprising a plurality of stepping switches and cooperating relays. Four stepping switches 61, 62, 63 and 64 are shown by way of example in FIG. 8, but it will be understood that more or fewer may be used according to the number of points that are to be selected. Each of the switches has a plurality of levels designated by the letters A, B, C, D, etc. and each level has two series of contacts designated respectively A1, A2, B1, B2, etc. There is also a double-ended moving contact or runner R at each level. The runners for all of the levels of each switch are ganged so as to turn together and are driven by an operating coil or motor M. The first two levels A and B of each stepping switch are utilized to control the stepping of the switch and to control lights indicating the position of the switch as will be described more fully below. The remaining levels are utilized for selecting the points of connection to a circuit being tested. For this purpose, the contacts of these levels are individually connected by suitable multiple conductor cables to the individual pins of corresponding sockets which, as described above, are provided at the rear of the housing and are in turn connected by suitable cables to sockets of the circuit being tested. Eight sockets S0 to S3 and S10 to S14 are shown by way of example. The pins of each socket are numbered sequentially from 1 to 10. It will be noted that one series of contacts at each level is connected to an odd numbered socket while the other series of contacts at that level is connected to an even numbered socket. Thus for example contacts 61C1 are connected to the pins of socket S1 while contacts 61C2 are connected to the contacts of socket S0. Switches 61 and 62 control the selection of the first point of connection while switches 63 and 64 control the selection of the second point of connection to the circuit being tested.

Relays shown in FIG. 7 cooperate with the stepping switches of FIG. 8 to select the points of connection to the circuit being tested. Relays 71, 72, 73 and 74 control the stepping of switches 61, 62, etc. and thereby determine the "pin" selection. Relays 75, 76A, 76B, 77, 78, 79A and 79B determine which level of which stepping switch is used and thereby control the "socket" selection. Relays 68, 69 and 70 control the energizing of the motors of the stepping switches and cooperate with relays 71 to 74 to determine the starting and stopping of the stepping switch motors. Relay 70 is controlled by relay 51 (FIG. 9) which in turn is controlled by the rotary control switch 45 (FIG. 5) so that relay 70 is energized when the tape driving drum is in first position so as to present to the brushes a row of holes controlling the selection of the first point of connection to the circuit being tested. When relay 70 is energized, it supplies current from a B+ terminal F18 (FIG. 7) to relays 71 to 79B. The returns of relays 71 to 79B are connected through terminals F1 to F9 respectively to corresponding contacts of the tape reader so that relays are controlled by the tape. When a hole is punched in the tape the corresponding contact of the tape reader is grounded by its brush so as to complete the circuit and thereby energize the corresponding relay. Thus for example if a hole is punched in the first block of the first position of the tape relay 71 is energized.

Relays 71, 72, 73 and 74 control the stepping of switches 61 and 62 by grounding a selected contact on one of the control levels of the respective switchs. It will be seen that movable contact b of relay 74 is grounded. The stationary contacts of relay 71 are connected respectively to contacts 61A1 and 61B2 of stepping switch 61 and also to corresponding contacts 62A1 and 62B2 of stepping switch 62. Hence, depending on which of the relays 71 to 74 are energized, one or another point in each control section of stepping switches 61 and 62 is grounded. As the significant blocks are the ones not punched, it is the unenergized relays that determine the selection.

The operation of stepping switch 61 or 62 is initiated by the closing of relay 69. This relay is energized from the B+ conductor by the closing of one of the contacts of relay 70 but its closing is delayed approximately 25 to 50 milliseconds in order to assure that relays 71 to 74 have time to operate before switch 61 or 62 begins stepping. When contact b of relay 69 closes, voltage is applied through contact b of relay 68 and contact d of relay 79B to the motor of one or the other of stepping switches 61 and 62 depending on the position of relay 79B. The selected switch continues to step automatically until a runner on the selected control level of the switch engages a contact that has been grounded by the energizing of selected ones of relays 71 to 74. One end of the operating coil of relay 68 is connected to the B+ supply while the other end is connected by contacts a and b of relay 75 and contacts a and b of relay 79B with the runner of one of the control levels of stepping switch 61 or 62 depending on the positions of relays 75 and 79B. As will be pointed out more fully below, relays 75 and 79B cooperate in determining which socket is to be selected and thereby determining whether the selection is to be made through stepping switch 61 or through stepping switch 62 and also which side of a level is to be used according to whether an odd number or even numbered socket is to be selected. When the selected runner engages a grounded contact, the circuit of the operating coil of relay 68 is completed so that this coil is energized and contact b of relay 68 is opened to interrupt the supply of current to the motor of the selected stepping switch. The switch thereupon stops and remains in the selected position to which it has been moved thereby determining the "pin" selection.

Contacts 61A2 and 61B1 of stepping switch 61 and the corresponding contacts of stepping switch 62 are connected through leads I1 to I10 to the respective ones of lamps L1 (FIG. 9), the other sides of which are connected to a B+ terminal F18. Thus one or another of the lamps L1 will be lighted to indicate the number of the pin that has been selected. As seen from FIG. 1, the lamps L1 are located on the front panel of the housing.

The "socket" selection is effected by relays 75 to 79B (FIG. 7). When the tape is in the first position so that control switch 45 energizes relay 51 and slave relay 70, one end of the operating coil of each of relays 75 to 79B is connected to a B+ conductor. Thus the operating coil of relay 75 is connected to B+ through its back contact $e$ and a contact of relay 51. Relay 79B is similarly connected through its back contact $f$. Relays 76B, 77, and 78 are similarly connected to B+ through contacts of relay 70. Relays 76A and 79A are in effect slave relays to provide additional contacts. The opposite ends of the operating coils of relays 75 to 79B are connected respectively to corresponding contacts 40 of the tape reader. Hence the actuation of the relays is controlled by the punching of the tape when the tape is in position number 1. As described above, the first four blocks in the first row control the "pin" selection. Blocks 5 to 9 control relay 75 to 79B to determine the "socket" selection. When a hole is punched in the tape the corresponding relay is energized. Thus for example if a hole is punched in block number 5, relay 75 will be energized. Contacts $d$ and $e$ of this relay are "make-before-break" contacts. When the relay is energized, contact $d$ connects one end of the operating coil to a direct ground instead of to ground through the corresponding contact 40 and brush of the tape reader. Contact $e$ connects the opposite end of the operating coil of the relay to an "interrupted" B+ conductor designated IB+. Contacts $d$ and $e$ thus constitute "holding" contacts so that the relay will remain energized even when relays 51 and 70 are deenergized and the corresponding contact 40 of the tape reader is no longer grounded as happens when the tape is moved to the second position. Conductor IB+ is referred to as an "interrupted" B+ supply because it is momentarily deenergized during passage of the tape from position number 4 to position number 1 in order to clear the setting of relay 75 to 79B and thereby prepare for the next test. Relays 76B to 79B are controlled in similar manner from corresponding contacts of the tape reading means and when energized they are held until the setting is cleared when passing from tape position 4 to tape position 1.

The moving contact of relay 79A is connected through lead $f15$ to terminal 1 of the bridge circuit 46 (FIG. 6b). The stationary contacts of relay 76A are connected respectively through terminals H1 to H6 and H9 to H14 to the runners of corresponding levels of stepping switches 61 and 62 (FIG. 8). As described above, relay 79B determines which of the stepping switches operates while relay 75 determines whether the "odd" side or the "even" side of the selected stepping switch level is effective since the runner will stop either on one of the contacts 1 to 10 or on one of the contacts 11 to 20 depending on the position of relay 75. Thus relays 75 to 79B determine the selection of the socket by connecting terminal number 1 of the bridge circuit 46 with the runner of a selected level of a selected stepping switch. The positioning of the runner under control of relays 71 to 74 as described above determine which pin of the socket is selected. Terminal number 1 of the bridge circuit is thereby connected to a selected pin of a selected socket.

Contacts $c$ of relays 75 and 79B, contact $a$ of relay 76B and contacts $d$ of relays 77 and 78 control corresponding lights of a bank of lamps L2 (FIG. 9) to indicate what socket has been selected. These lamps likewise are located on the front panel of the housing.

After the first point of connection to the circuit being tested has been selected, the apparatus is ready to move on to the second tape position to select the second point of connection. The motor 40 of the tape drive is controlled by relay 50 (FIG. 9) which in turn is controlled by a proceed loop P1 when the tape is in first position. Through the circuitry shown in the drawings, a B+ voltage is ordinarily supplied to terminal F16 of FIG. 7. The proceed loop P1 extends from this terminal through contacts $a$ of relays 68 and 69 and through selected ones of contacts $a$ of relays 74, 73, 72, 77 and 78 returning to terminal F17. From here the loop continues through contact $a$ of relay 51 (FIG. 9) and to one end of the main operating coil of relay 50 which controls the tape drive motor, the other end of the coil being connected to ground to complete the circuit. As relays 51 and 69 are energized when the tape is in first position the proceed loop circuit will be closed to energize relay 50 as soon as relay 68 is energized upon completion of the pin selection as described above, provided that contacts $a$ of relays 72, 73, 74, 77 and 78 are in a "possible" combination. The tape has been incorrectly punched so as to call for an impossible combination, the proceed loop will not be completed and the apparatus will not proceed automatically to the second tape position. For example if none of relays 72, 73 or 74 is energized, the proceed loop will remain open since this setting of the relays would call for the selection of pin number 14 whereas there are only 10 pins for each socket. The proceed loop is also connected through terminal F14 of FIG. 7 with the first of a series of lights L3 (FIG. 9) to indicate the position of an error on the tape so that it can be checked by an operator. After the error has been noted, the operator can cause the apparatus to proceed by manual manipulation of a "proceed" lever P (FIG. 9d).

When the tape has been moved to second position, relay 52 (FIG. 9) is energized by the rotary control switch 45 and a second point of connection to the circuit being tested is made by stepping switches 63 and 64 controlled by a relay assembly (not shown) which is essentially the same as that for first point selection as shown in FIG. 7. Terminal number 2 of bridge circuit 55 is thereby connected to the second selected point of the circuit to be tested and the apparatus moves onto the third tape position under control of a proceed loop in substantially the same manner as described above. Lights L6 and L15 indicate pin and socket selection respectively. It will be understood that the tape can be programmed in advance for testing circuits or portions thereof in either or both directions thereby to provide for testing circuits incorporating semi-conductors whose resistivity is different in both directions. Accordingly the apparatus can select a first point of connection to the circuit being tested point and a second point of connection as disclosed above and the order of connection to the points may be reversed so that the circuit is tested in the opposite polarity or other direction as disclosed below with respect to a selected direction.

The resistance in the selected direction between the selected points of the circuit being tested is compared with a standard resistance selected by the circuit shown in FIG. 9 comprising FIGS. 9a to 9e. The programmed resistance value is selected by means of switches or relays arranged to connect selected ones of a plurality of standard resistance elements between terminals 2 and 3 of the bridge circuit 55. Eight relays numbered 81 and 88 are shown by way of example in the drawings. The standard resistance elements are arranged in banks, two banks numbered 89 and 90, respectively being shown. In each bank the resistance units are arranged in a plurality of levels which have been designated A, B, C, D and E. Contacts $a$, $b$, $c$, $d$ and $e$ of relays 81 to 88 are arranged to short circuit selected resistance units when the respective relays are energized. The resistance units which are not shorted remain in circuit and constitute the selected resistance units. In the circuit shown, relays 81, 82, 83 and 84 cooperate with the units of resistance bank 89 to determine the first digit of the resistance value to be selected. Relays 85, 86, 87 and 88 cooperate in like manner with the units of resistance bank 90 to determine the second digit. A similar assembly is provided for each additional significant digit of the resistance value to be selected. While it will be understood that the invention is not limited to particular resistance values, the values of resistance units in banks 89 and 90 have been shown by way of example to illustrate the arrangement of the resistances. Starting at the right hand end of the lowest horizontal row in bank 49 it will be seen that the first resistance unit has a value of 100 ohms, the second 200, third 400 and the fourth 800. Thus by shorting out selected ones of these resistance units, it is possible to leave in the circuit any resistance value from 100 to 1000 ohms by 100 ohm steps. For example if relays 82 and 84 are energized to short cut the 200 ohm and 800 ohm resistance units, the 400 ohm and 100 ohm units will remain connected in series with one another to provide a total resistance of 500 ohms. The arrangement is the same in each higher level of the resistance bank 89 except that the resistance value of each unit is ten times the value of the corresponding unit in the next lower horizontal row. The arrangement of resistance units in bank 90 is the same as in bank 99 except that each unit in bank 90 has a resistance value which is one tenth that of the corresponding resistance in bank 89. In like manner if a third bank is used, its units will have one tenth the value of the corresponding units of bank 90. The value of the resistance selected is determined by energizing selected ones of relays 81 to 88 to determine which of the resistance units are shorted out and (as will be described later) by selecting which of the horizontal rows of resistances is to be used.

When the tape is moved to the third position relays 53A and 53B (FIG. 9) are energized by the control switch 45 synchronized with the tape drive motor. The closing of relays 53A and 53B connects one end of the operating coil of each of relays 81 to 88 with a B+ supply. The connection is made through the back contact $i$ of each relay. The other end of the operating coil of each of relays 81 to 88 is connected respectively to one of the contacts of the tape reader so as to be grounded by the corresponding brush when a hole has been punched at a corresponding position in the tape. When a relay is energized its contact $i$ connects one end of the operating coil to an interrupted B+ conductor IB+ which as described above, provides B+ voltage except that it is interrupted momentarily between the fourth and first positions of the tape. Contact $j$ connects the other end of the operating coil directly to ground thereby replacing the ground connection through the tape reader. Hence even when the tape is moved on to the fourth position, the relay will continue to be energized. The energizing of selected ones of relays 81 to 88 is thus controlled by the punching of the tape in the third position to select the significant digits of the resistance value as indicated in the sample tape section shown in FIG. 3.

Contacts $g$ of relays 81 to 84 together with contacts $h$ of relay 82 control lights 16 to indicate the first digit of the resistance selector. Similarly relays 85 to 88 control lights L7 to indicate the second digit, etc. These lights are located on the front panel of the apparatus to provide a convenient indication of the value of resistance that has been selected.

When the significant digits of the selected resistance value have been set up as described, relay 50 which controls the tape drive motor is energized to advance the tape to position 4 provided that the requirements of a proceed loop P3 are satisfied. The proceed loop is connected at one end to the B+ supply, extends through contacts $f$ of relays 82, 83, 84, 86, 87 and 88 and contact $g$ of relay 53B to one end of an operating winding of relay 50, the other end being grounded.

In its fourth position, the tape controls selecting switches or relays which complete the selection of the resistance value by determining the number of zeros that are to follow the significant figures selected at tape position 3. The determination of the number of zeros is made by selecting one or another of the horizontal rows of resistance units in resistance banks 89 and 90. (FIG. 9). The selection is controlled by relays 91, 92 and 93. When the tape is moved to the fourth position, relay 54 (FIG. 9) is energized by the control switch 55 synchronized with the tape drive motor. The closing of relay 54 connects one end of the operating coil of each of relays 91, 92 and 93 with a B+ supply. The other end of each operating coil is connected to a corresponding contact of the tape reader so that the energizing of relays 91, 92 and 93 is controlled by the punching of the tape. The left hand ends of all of the horizontal rows of resistance units in resistance bank 89 are connected through lead A22 to terminal 2 of the bridge circuit 55 (FIG. 6). Moving contact $a$ of relay 91 is connected through lead A24 to terminal 3 of the bridge circuit. From the circuit diagram, it wil be seen that one or another of the horizontal rows of resistance units is connected between terminals 2 and 3 of the bridge circuit depending on which of relays 91, 92 and 93 are energized.

Contacts $d$ of relays 91, 92 and 93 control lamps L8 which are located on the front panel of the apparatus and indicate the number of zeros that has been selected. Contacts $c$ are in a proceed loop P4 which controls continuance of the test and cooperates in determining the movement of the tape from position 4 to position 1.

When terminals 1 and 2 of the bridge circuit 55 have been connected respectively to selected points of the circuit to be tested and a selected standard resistance has been connected between terminals 2 and 3 of the bridge circuit as described, the unknown resistance Rx in the selected direction between the selected points of the circuit is compared with the programmed standard resistance Rs to determine whether the unknown resistance equal the standard resistance within a selected tolerance. A comparison of the resistances and a selection of the tolerance values and limits are effected by the bridge amplifier circuit shown in FIG. 10 and certain relays and circuitry shown in FIG. 6. Terminal 3 of the bridge circuit 55 is connected by lead C8 with a voltage source which supplies for example six volts direct current. Terminal 1 of the bridge circuit is grounded. Hence current will flow through the bridge circuit from terminal 3 to terminal 1. Since resistances R1 and R2 are equal, the voltage at terminal 4 will be one half of that at terminal 3 and will hence be 3 volts when a six volt source is used. If resistances Rs and Rx are equal to one another, the voltage at terminal 2 of the bridge circuit will likewise be 3 volts. If Rx is less than Rs the voltage at terminal 2 will be less than 3 volts and hence less than terminal 4 which may be considered as a reference point. Conversely, if resistance Rx if greater than Rs the voltage at terminal 2 will be greater than the reference voltage at terminal 4.

The use of unidirectional current and the selection of points of connection to the circuit being tested in the manner shown and described make it possible to check the resistance between the points in a selected direction. Some circuits, for example a circuit containing a diode, have a different resistance depending on the direction of current flow. With the apparatus of the invention the tests can be programed to check the resistance between selected points first in one direction and then in the other.

The bridge amplifier comprises an amplifying tube 101 having a control grid connected to the movable contact of a chopper relay 102. The fixed contacts of the relay are connected respectively by leads D18 and D15 to terminals 2 and 4 of the bridge circuit 55. The relay 102 is alternately energized and de-energized by a multivibrator 103 which is controlled by a relay 100. When the relay 102 is de-energized the control grid of amplifier tube 101 is connected to reference terminal 4 of the bridge circuit. When relay 102 is energized the control grid of amplifier tube 101 is connected to terminal 2 of the bridge circuit. As relay 102 is a "make-before-break" relay, a steady voltage will be applied to the control grid of tube 101 if the voltage at terminal 2 of the bridge circuit is equal to the reference voltage at terminal 4. If the voltages are unequal, a positive or negative pulse will be applied to the control grid of tube 102 depending on whether the voltage at terminal 2 of the bridge circuit is greater or less than the reference voltage. The timing of the multivibrator 103 is such that the grid of tube 101 is connected to the terminal 2 of the bridge circuit for shorter periods than to the reference point 4.

The plate of tube 101 is connected to the control grid of a second amplifying tube 104. The cathode of tube 104 is connected to a "magic eye" tube 105 which gives a visual indication of the balance or unbalance of the bridge circuit. The plate of tube 104 is connected to one plate and to one cathode of a dual diode 106 which separates positive and negative pulses. The corresponding cathode and anode of the tube 106 are connected respectively to the grid of an amplifying tube 107 and the grid of an amplifying tube 108 in such manner that positive pulses are fed to tube 107 while negative pulses are fed to tube 108. The pulse is inverted by tube 107 and fed to the control grid of a multivibrator 109. The tube is normally conducting and its plate circuit is connected in series with the operating coil of a relay 111. The relay is hence normally energized. However, each time a pulse of predetermined magnitude reaches tube 109, it is momentarily cut off to de-energize relay 111. Negative pulses fed to tube 108 are likewise inverted and are transmitted to a multivibrator tube 110 controlling a relay 112 in like manner except that the pulse is reinverted by the left hand section of tube 110.

If the unknown resistance $R_x$ between selected points of the circuit being tested is equal to the selected standard resistance $R_s$, no pulses are transmitted to either of tubes 109 or 110 and hence relays 111 and 112 both remain energized. If $R_x$ is greater than $R_s$, pulses are transmitted to tube 109 and if these pulses exceed a selected magnetiude, each pulse momentarily cuts off tube 109 and de-energizes relay 111 causing it to "pulse." Conversely, if $R_x$ is less than $R_s$ relay 112 is periodically de-energized. Contact $a$ of relay 111 controls a light L16 on the front panel (FIG. 11) to indicate that the resistance exceeds the selected value. Likewise, contact $a$ of relay 112 controls a lamp 114 to indicate that the unknown resistance is less than the programed resistance by an amount exceeding a selected tolerance. If both relays are energized a lamp L15 is lighted to indicate that $R_x$ equals $R_s$ within the tolerance values selected.

Programed tolerance values are automatically selected by selecting switches or relays which operate to vary the grid resistance of tube 104 of the bridge amplifier circuit. As shown in FIG. 6, the tolerance values are selected by relays 121, 122 and 123 which may for example represent values 5%, 10% and 20% tolerance. The tolerance limits are selected by relays 124, 125 and 126 which represent respectively "less than," "plus or minus" and "greater than." When the proceed loop P4 described above is satisfied, a relay 120 (FIG. 6) is energized to connect one of the operating coil of each of relays 121 to 126 to a B+ voltage line. The other end of each operation coil is connected respectively to a corresponding contact of the tape reader so that the actuation of the relays is controlled by the punching of the tape in position number 4. The positions of the blocks in row number 4 of the tape controlling the tolerance selections are indicated by way of example in FIG. 3. As with other selections, the undesired values are punched out leaving the selected value unpunched. When relay 121 is de-energized, its contact c connects the control grid of tube 104 (FIG. 10) to B— through an adjustable resistance R5. Likewise when relays 122 and 123 are de-energized they connect the grid of tube 104 to B— through adjustable resistances R6 and R7, respectively. In order for the tape to be correctly punched, two of the tolerance values must be punched out leaving only one so that only one of relays 121, 122 and 123 is energized at a time. The grid resistance as selected by the relays 121, 122 and 123 determines the magnitude of a pulse transmitted by tube 104 and thereby determines the amount $R_x$ can differ from $R_s$ without cutting off one or the other of multivibrators 109 and 110. Contacts $d$ of relays 121, 122 and 123 control lamps L11, L12 and L13, respectively on the front panel to indicate the tolerance value as selected.

When relay 124, which is the "less than" relay, is energized, its contact $b$ shunts contact $b$ of relay 112 (FIG. 10) so that the requirements of the setting are satisfied and the apparatus is able to proceed to the next test even though relay 112 is intermittently de-energized because of the resistance value being less than that programmed by the punching of the tape. In like manner, relay 126 which is the "greater than" relay has a contact $b$ which shunts a corresponding contact $b$ of relay 111 when relay 126 is de-energized. If relays 124 and 126 are energized and relay 125—which is the plus or minus relay—is de-energized, the value of $R_x$ must equal the selected standard value $R_s$ within the tolerance value set up by relays 121, 122 and 123 in order for a "pass" condition to exist.

The proceed loop P4 shown in FIG. 9 extends through lead A28 to FIG. 5 and through lead B28 to FIG. 6 where it includes contacts of relays 21 to 26. For example contacts $a$ of relay 121 and contacts $a$ and $b$ of relay 122 are in the proceed loop P4. When the proceed loop P4 is satisfied it supplies current to energize a relay 130 (FIG. 6) which in turn energizes a relay 131 having delayed-make characteristics. When relay 131 closes, its contact $b$ interrupts a circuit which connects relay 100 (FIG. 10) with a B+ supply and thereby de-energizes relay 100. As described above, relay 100 controls the multivibrator 103. When relay 100 is de-energized it puts the multivibrator 103 into operation causing relay 102 to pulse so as to connect the bridge amplifier circuit alternately to the reference point 4 and the test point 2 of the bridge circuit 55. Thus the comparison of the unknown resistance $R_x$ with the programmed resistance $R_s$ does not start until after the resistance values and the tolerance values and limits have been set up.

The tape drive is operated to move the tape from position 4 to position 1 only when the programed test has been completed and the test results satisfy the requirements of the test as determined by the punching of the tape. Even then the apparatus will not proceed automatically unless the "stop" block in the tape has been punched. As illustrated in FIG. 3 this is the twelfth block in the fourth row. Movement of the tape from position 4 to position 1 of the next test is controlled by relay 132 (FIG. 6) which is energized by a fifth proceed loop P5. As shown in the drawings, the proceed loop P5 connects one end of the operating coil of relay 132 (FIG. 6) with the B+ supply of multivibrator 103 (FIG. 10) through contact $a$ of relay 104, an adjustable resistance R10 (FIG. 6), contact $d$ of relay 130, contacts $b$ of relays 111 and 112 (FIG. 10) and a manual "stop-proceed" switch SP (FIG. 11). The other end of the operating coil is connected to ground through one of the contacts of the tape reader when a hole is punched in the tape at the corresponding location. As illustrated in FIG. 3, the controlling block of the tape is block number 12 in row number 4 which is labeled "stop." Thus in order for relay 132 to be energized to advance the tape, relay 104 must be de-energized, relays 111, 112 and 130 must all be energized, the switch SP must be in normal position and the "stop" block in row 4 of the tape must be punched out to provide a ground return. However, as described above, contact b of relay 124 (FIG. 6) shunts contact b of relay 112 to provide a closed circuit even if relay 112 is not energized because the unknown resistance Rx is less than the selected resistance Rs. In like manner when relay 126 is de-energized its contact b shunts contact b of relay 111. If the switch SP (FIG. 11) is moved to "stop" position, the proceed circuit P5 is interrupted even though all conditions are otherwise satisfied and the apparatus will not move from position 4 to position 1 of the next test. Conversely, if switch SP is moved to "proceed" position, the apparatus will advance even though the other conditions are not met. The adjustable resistance R10 (FIG. 6) in conjunction with a condenser 133 connected between the "high" side of the operating coil of relay 132 and ground, provide a time delay in the closing of relay 132. Moreover, if relay 111 or 112 (FIG. 10) is "pulsing" by reason of the unknown resistance Rx being higher or lower than the selected resistance Rs beyond the selected tolerance values, the condenser 133 prevents relay 132 from being energized sufficient to close its contacts.

When relay 132 is energized, contact a opens to cut off the voltage supply to contacts a of relays 111 and 112 (FIG. 10) which control lamps L14, L15 and L16 (FIG. 11). Contact b connects the low side of the operating coil of the relay directly to ground thereby replacing the ground provided through the tape reader. Contact c closes a circuit to energize relay 50 (FIG. 9) which controls the tape drive motor and thereby causes actuation of the motor to advance the tape from position number 4 to position number 1 of the next test. At the same time, contact c of relay 132 interrupts the circuit that supplies B+ voltage from a constant B+ supply to the interrupted B+ circuit IB+ which, as described above, provide the "holding" current for the relays which select the points of connection to the circuit being tested and the resistance values in positions 1, 2 and 3 of the tape. Hence the interruption of B+ current by contact c of relay 132 de-energizes the selecting relays and prepares them to make a new selection for the next test.

When the tape is moved from position 4 to position 1, relay 54 is de-energized by the rotary control switch 45. This results in interrupting the proceed loop P4 so that relays 120, 130, 131 and 132 are all de-energized. Voltage is thereby restored to the interrupted B+ circuit IB+ so that selecting relays will be held as described above when they are energized. As it ordinarily requires more time for a relay to become de-energized than for it to be energized, provision is made to assure that voltage is restored to the holding circuit IB+ immediately, even though there may be some delay in the opening of relay 132. This is effected by contact e of relay 70 (FIG. 7) which closes to connect the holding circuit IB+ with a B+ supply.

A further safeguard to assure correct operation of the apparatus is provided in the bridge amplifier circuit shown in FIG. 10. When a pulse is transmitted it tends to overshoot so that a pulse in one direction is immediately followed by a pulse in the reverse direction. Because of this characteristic, multivibrators 109 and 110 might both be momentarily cut off. To prevent this undesired effect of overshooting, relay 111 is provided with a contact c which connects the grid circuit of tube 108 with a B− supply when the relay de-energized. In like manner, relay 112 is provided with a contact c to connect the grid circuit of tube 107 to B− when relay 112 is de-energized.

In adidtion to the indicators and controls described above, the front panel 23 of the apparatus is provided with a calibrating switch 135 (FIG. 1) which is a manual rotary switch having a plurality of switch wafers 135a to 135f. As indicated schematically in connection with wafer 135f, the switch has six positions namely −10%, "balance," "operate," 5%, 10% and 20%. A plurality of standard resistances having the values indicated are connected with the contacts of switch wafer 135d as shown. The contacts made by the switches when in the several positions will be apparent from the drawings. The switch is normally in "operate" position. It is movable to the 5%, 10% and 20% positions in order to adjust the corresponding tolerance settings. Adjustment is effected by varying the resistance of resistances R5, R6 and R7, respectively. (FIG. 10). In order to balance the "under" tolerances with the "over" tolerances, an adjustable resistance R8 is provided in the connection between tubes 106 and 108. Resistance R8 is adjusted when switch 135 is in "−10%" position. With the switch in "balance" position, the standard resistances R1 and R2 are balanced against resistances associated with switch wafer 135d in order to check whether the value of the resistances R1 and R2 might have changed. Moreover, with switch 135 in "balance" position, the value of the resistance which has been set up by the apparatus under control of the tape can be checked by means of an external ohmmeter plugged into receptacles 136 (FIG. 6) connected to points 2 and 4 of the bridge circuit. In like manner the unknown resistance Rx between selected points of the circuit being tested can be checked by plugging an ohmmeter into terminals 137 connected to points 1 and 2 of the bridge circuits.

The operation of the apparatus will be apparent from the foregoing description. Using a circuit diagram of the circuit to be tested, a tape is punched to program the desired tests. Preferably the ends of the tape are joined so as to make a continuous loop. The prepared tape is inserted in the tape control unit and positioned so as to be synchronized with the control switch 45. For this purpose, it is desirable to have every fourth one of the driving pins on the drum 27 of a different appearance to indicate the location of row number 1 of the tape. By means of multiple conductor cables, connections are made between sockets on the back of the apparatus and sockets of the circuit to be tested so as to provide connections with the circuit in accordance with the programming of the tape. The apparatus is then started and proceeds sequentially and automatically through the entire series of tests programed by the tape provided that satisfactory results are obtained for each test. If an error has been made in punching the tape so as to call for an impossible combination, the apparatus will stop. Such stoppage may occur in any of the four positions of the tape and the point at which the apparatus stops indicates in which position the error occurred. Moreover, an indication, is made by illuminating one or another of the light L3 on the front panel. If the apparatus stops in any position other than position 4, it can be made to proceed to position 4 by operating the proceed switch P. (FIG. 9d). As the tape is visible, it can readily be check to determine what the error is. The apparatus will also stop if the resistance Rx between selected points of the circuit being tested does not match the selected resistance Rs within the selected tolerance values and limits. In this event, stoppage will occur in position 4. As the indicators on the front panel show the points of connection the resistance selected, the tolerance values and limits selected and whether the unknown resistance Rx is "under" or "over" the nature and location of the defect are readily apparent. After the defect has been noted, the operator can actuate the "proceed" switch SP (FIG. 11) to cause the apparatus to proceed with the test program.

It will be seen that the apparatus provides a convenient, rapid and dependable method of testing circuits. While a preferred embodiment of the apparatus has been shown in the drawings, and particularly described, it will be understood that the invention is in no way limited to this particular embodiment.

What we claim and desire to secure by Letters Patent is:
1. In apparatus for testing electrical circuits, a tape control unit comprising tape feeding means and tape reading means, a bridge circuit having four terminals, first selector switch means for connecting a first terminal of said bridge circuit with one point of a circuit to be tested, second selector switch means for connecting a second terminal of said bridge circuit with a second point of the circuit to be tested, a plurality of impedance elements of standard value, third selector switch means for connecting selected ones of said elements between said second terminal and a third terminal of said bridge circuit, matched impedances connected between said third terminal and a fourth terminal of said bridge circuit and between said fourth and first terminals of said bridge circuit a balance indicator means connected between said second and fourth terminals to indicate whether the impedance between the selected points of the circuit to be tested is below or above the selected impedance, a control switch operated in synchronism with said tape feeding means to connect said tape reading means successively with said first, second and third selector switch means whereby the selections made are controlled respectively by successive portions of said tape and means for holding the selections made by said first and second selector means until said third selecting means has made a selection.

2. In apparatus for testing electrical circuits, a tape control unit comprising tape feeding means and tape reading means, impedance comparing means, a plurality of impedance elements of standard value, first selector means for connecting said comparing means with two selected points of a circuit to be tested, second selector means for connecting said comparing means with selected ones of said impedance elements said comparing means being operative to compare the impedance between the selected points of the circuit to be tested with the selected standard impedance, a control switch connected to and operated in synchronism with said tape feeding means to connect said tape reading means successively with said first and second selector means so that the selections are made successively and are controlled respectively by successive portions of said tape, and means for holding the first selection until the second selection has been made.

3. In apparatus for testing electrical circuits, a tape control unit comprising tape reading means and means for feeding said tape step-by-step to present successive portions of tape to said reading means, impedance comparing means, a plurality of impedance elements of standard value, first selector means for connecting said comparing means with a first point of a circuit to be tested, second selector means for connecting said comparing means with a second point of said circuit, third selector means for connecting said comparing means with selected ones of said impedance elements, said comparing means being operative to compare the impedance between the selected points of said circuit with that of the selected impedance elements, means connected with said comparing means to indicate a difference between said impedance exceeding a selected tolerance value, means for varying said tolerance value, fourth selector means for selecting a tolerance value, control switch means connected to and operated in synchronism with said tape feeding means to connect said tape reading means successively with said first, second, third and fourth selector means so that the selections are made successively and are controlled respectively by successive portions of the tape, and means for holding the selections until the last selection has been made.

4. Apparatus according to claim 2 in which means is provided for checking the value of the selected standard impedance and for measuring the unknown impedance between the selected points of the circuit being tested.

5. In apparatus for testing electrical circuits, a control unit comprising tape feeding means and tape reading means for reading a removable tape, the tape being programmed in advance determining what portions of a circuit are to be tested and the sequence thereof and programmed indicating the value of the correct impedance of each circuit portion to be tested, means controlled by said control unit and responsive to the reading of said tape for successively selecting two points of connection on a circuit corresponding to selected circuit portions the respective impedances of which are to be tested in one of both directions including means for selecting the direction in which the impedance is to be tested between said two selected connection points, means controlled by said control unit and responsive to the reading of the tape by said reading means for automatically selecting and arranging selected combinations of values of standard impedance elements according to the programming on the tape and according to the direction in which impedance is to be tested between said two connection points, the impedance value of each combination of impedance elements corresponding to the correct impedance value of a corresponding circuit portion in one of said both directions, and means controlled by the control unit and responsive to the reading of said tape for automatically comparing the impedance between the two selected points corresponding to the individual selected portions of the circuit under test and the impedance value of the selected combination of impedance elements corresponding to the correct impedance value of the circuit portion under test in the selected direction.

6. In apparatus for testing electrical circuits, a tape control unit comprising tape feeding means and tape reading means, a bridge circuit having four terminals, first selector means controlled by said control unit and responsive to the reading of said tape for connecting a first terminal of said bridge circuit with one point of a circuit to be tested, second selector means controlled by said control unit and responsive to the reading of said tape for connecting a second terminal of said bridge circuit with a second point of the circuit to be tested, a plurality of impedance elements of standard value, third selector means controlled by said control means and responsive to the reading of said tape for connecting selected ones of said elements between said second terminal and a third terminal of said bridge circuit, matched impedances connected between said third terminal and a fourth terminal of said bridge circuit and between said fourth and first terminals, means applying a potential between said first and third terminals, a bridge amplifier having an input and output means including means for connecting the input of said amplifier alternately to said second and fourth terminals of said bridge circuit, and thereby compare the impedance between the two selected points of the circuit to be tested with that of the selected standard impedance elements, and indicating means connected to the output of said bridge amplifier circuit.

7. Apparatus according to claim 6, in which the bridge amplifier circuit has two symmetrical parallel branches connected to the input of said amplifier, one of said branches passing only a negative pulse and the other of said branches passing only a positive pulse, said branches having separate outputs and said indicating means comprising an "over" indicator and an "under" indicator connected respectively to said outputs, the connection being such that the "over" indicator is actuated if the unknown impedance between the selected points of the circuit to be tested exceeds the selected standard resistance by more than a selected amount and the "under" indicator is actuated if the unknown impedance is less than the selected standard impedance by more than a selected amount.

8. Apparatus according to claim 6, further comprising means for determining permissible tolerance in variation of the unknown impedance between the selected points of the circuit being tested and the selected standard impedance, fourth selector means controlled by said control unit and responsive to the reading of said tape for selecting a tolerance value, means for connecting said fourth selector to the tape reading means so that tolerance selection is controlled by the tape, and means indicating the tolerance selected.

9. Apparatus according to claim 6, in which means are provided for checking the value of the selected standard impedance and for measuring the unknown impedance between the selected points of the circuit being tested.

10. In apparatus for testing electrical circuits, a tape control unit comprising means for feeding a continuous programmed tape and means for reading successive portions of said tape as it is fed, impedance comparing means, a plurality of impedance elements of standard value, first selector means controlled by said control unit and responsive to the reading of said tape for connecting said comparing means with a first selected point in a circuit being tested, second selector means controlled by said control unit and responsive to the reading of said tape for connecting said comparing means with a second selected point of said circuit, third selector means controlled by said control unit and responsive to the reading of said tape for connecting said comparing means with a selected combination of said standard impedance elements, to provide an impedance value corresponding to the correct impedance value between said selected points in the circuit being tested, said comparing means having means operative to balance the unknown impedance between the selected points of the circuit being tested against that of the selected combination of standard impedance elements, fourth selector means controlled by said control unit and responsive to said tape reading means for selecting a tolerance value by which said unknown impedance may vary from the impedance of the selected standard impedance elements, means connecting all of said selector means to said tape reading means so that the selections are controlled by tape fed to said reading means, first indicating means to identify the first selected point of said circuit, second indicating means to identify the second selected point, third indicating means to indicate the value of the selected standard impedance, fourth indicating means to indicate the selected tolerance and fifth indicating means to indicate whether the unknown impedance is over or under the selected standard resistance by an amount exceeding the selected tolerance.

References Cited in the file of this patent

UNITED STATES PATENTS

| | | |
|---|---|---|
| 2,468,398 | Griffin | Apr. 26, 1949 |
| 2,798,199 | Potter | July 2, 1957 |
| 2,950,437 | Stahl | Aug. 23, 1960 |

OTHER REFERENCES

Rymsha: "Robot Circuit Tester," Radio-Electronics, July 1956. pp. 55–57.